US008542804B2

(12) United States Patent
Katis et al.

(10) Patent No.: US 8,542,804 B2
(45) Date of Patent: Sep. 24, 2013

(54) VOICE AND TEXT MAIL APPLICATION FOR COMMUNICATION DEVICES

(75) Inventors: Thomas E. Katis, Jackson, WY (US); James T. Panttaja, Healdsburg, CA (US); Mary G. Panttaja, Healdsburg, CA (US); Matthew J. Ranney, Oakland, CA (US)

(73) Assignee: Voxer IP LLC, San Francisco, CA (US)

(*) Notice: Subject to any disclaimer, the term of this patent is extended or adjusted under 35 U.S.C. 154(b) by 426 days.

(21) Appl. No.: 12/721,442

(22) Filed: Mar. 10, 2010

(65) Prior Publication Data

US 2010/0166159 A1 Jul. 1, 2010

Related U.S. Application Data

(63) Continuation-in-part of application No. 12/028,400, filed on Feb. 8, 2008.

(60) Provisional application No. 61/256,866, filed on Oct. 30, 2009, provisional application No. 61/259,094, filed on Nov. 6, 2009.

(51) Int. Cl.
    *H04M 11/00* (2006.01)

(52) U.S. Cl.
    USPC ............... 379/88.13; 379/88.16; 379/88.17; 379/93.01; 709/204

(58) Field of Classification Search
    USPC .............. 709/204–206; 710/29; 379/67.1, 379/85, 88.13, 88.22, 88.25–88.27, 88.04, 379/88.06–88.08, 88.16, 88.17, 88.23–88.28, 379/90.01, 93.01, 93.24, 88.11
    See application file for complete search history.

(56) References Cited

U.S. PATENT DOCUMENTS

| | | | |
|---|---|---|---|
| 4,807,224 A | 2/1989 | Naron et al. | |
| 5,117,422 A | 5/1992 | Hauptschein et al. | |

(Continued)

FOREIGN PATENT DOCUMENTS

| | | |
|---|---|---|
| EP | 1379061 | 7/2004 |
| WO | WO 03/073642 | 9/2003 |

(Continued)

OTHER PUBLICATIONS

International Search Report in corresponding PCT Application PCT/US2010/027687, mailed Jul. 1, 2010.
Written Opinion in corresponding PCT Application PCT/US2010/027687, mailed Jul. 1, 2010.
WikiPedia—The Free Encyclopedia, "*Eudora (email client)*," http://en.wikipedia.org/wiki/Eudora_(e-mail_client), Downloaded on Aug. 20, 2009, 3 pages.

(Continued)

*Primary Examiner* — Md S Elahee
(74) *Attorney, Agent, or Firm* — Beyer Law Group LLP

(57) ABSTRACT

A voice and text mail application method and apparatus capable of supporting both synchronous and asynchronous voice communication. The application is configured to (i) simultaneously and progressively store media of an incoming message as the media is received at a communication device over the network and (ii) provides a "catch up" rendering option which enables the rendering of previously received media of the message starting at any previous point of the message and to catch up the rendering to the current point or head of the message as the media of the message is being received. By rendering the previously received media of the incoming message out of storage at a rate faster relative to when the media of the incoming message was originally encoded, eventually the rendering will catch up and seamlessly transition the rendering from an asynchronous time-shifted mode out of storage to a synchronous mode as the media of the message is received over the network. In various alternative embodiments, the application also enables the (a) screening of the media of the incoming message as the media is received over the network; (b) the ability to join a live conversation with the sender of the incoming message as the media of the incoming message is received over the network, and/or (c) the option to ignore the media of the incoming message.

53 Claims, 12 Drawing Sheets

(56) References Cited

U.S. PATENT DOCUMENTS

| | | |
|---|---|---|
| 5,283,818 A | 2/1994 | Klausner et al. |
| 5,375,018 A | 12/1994 | Klausner et al. |
| 5,390,236 A | 2/1995 | Klausner et al. |
| 5,487,167 A | 1/1996 | Dinallo et al. |
| 5,524,140 A | 6/1996 | Klausner et al. |
| 5,572,576 A | 11/1996 | Klausner et al. |
| 5,651,054 A | 7/1997 | Dunn et al. |
| 5,692,213 A | 11/1997 | Goldberg et al. |
| 5,734,963 A | 3/1998 | Fitzgerald et al. |
| 5,737,011 A | 4/1998 | Lukacs |
| 5,918,158 A | 6/1999 | LaPorta et al. |
| 5,963,551 A | 10/1999 | Minko |
| 5,970,122 A | 10/1999 | LaPorta et al. |
| 6,037,932 A | 3/2000 | Feinleib |
| 6,092,120 A | 7/2000 | Swaminathan et al. |
| 6,104,757 A | 8/2000 | Rhee |
| 6,175,619 B1 | 1/2001 | DeSimone |
| 6,233,389 B1 | 5/2001 | Barton et al. |
| 6,262,994 B1 | 7/2001 | Dirschedl et al. |
| 6,378,035 B1 | 4/2002 | Parry et al. |
| 6,480,783 B1 | 11/2002 | Myr |
| 6,507,586 B1 | 1/2003 | Satran et al. |
| 6,564,261 B1 | 5/2003 | Gudjonsson et al. |
| 6,577,599 B1 | 6/2003 | Gupta et al. |
| 6,580,694 B1 | 6/2003 | Baker |
| 6,671,732 B1 | 12/2003 | Weiner |
| 6,717,925 B1 | 4/2004 | Leppisaari et al. |
| 6,721,703 B2 | 4/2004 | Jackson et al. |
| 6,791,949 B1 | 9/2004 | Ryu et al. |
| 6,807,565 B1 | 10/2004 | Dodrill et al. |
| 6,807,578 B2 | 10/2004 | Satran et al. |
| 6,829,473 B2 | 12/2004 | Raman et al. |
| 6,834,039 B1 | 12/2004 | Kelly et al. |
| 6,850,965 B2 | 2/2005 | Allen |
| 6,912,544 B1 | 6/2005 | Weiner |
| 6,931,114 B1 | 8/2005 | Martin |
| 6,970,926 B1 | 11/2005 | Needham et al. |
| 6,973,309 B1 | 12/2005 | Rygula et al. |
| 6,993,009 B2 | 1/2006 | Kelly et al. |
| 6,996,624 B1 | 2/2006 | LeCroy et al. |
| 7,002,913 B2 | 2/2006 | Huang et al. |
| 7,039,040 B1 | 5/2006 | Burg |
| 7,039,675 B1 | 5/2006 | Kato |
| 7,047,030 B2 | 5/2006 | Forsyth |
| 7,111,044 B2 | 9/2006 | Lee |
| 7,117,521 B2 | 10/2006 | Puthiyedath |
| 7,139,371 B2 | 11/2006 | McElvaney |
| 7,171,491 B1 | 1/2007 | O'Toole et al. |
| 7,187,941 B2 | 3/2007 | Siegel |
| 7,218,709 B2 | 5/2007 | Garg et al. |
| 7,233,589 B2 | 6/2007 | Tanigawa et al. |
| 7,236,738 B2 | 6/2007 | Settle |
| 7,240,105 B2 | 7/2007 | Satran et al. |
| 7,304,951 B2 | 12/2007 | Rhee |
| 7,305,438 B2 | 12/2007 | Christensen et al. |
| 7,313,593 B1 | 12/2007 | Pulito et al. |
| 7,349,871 B2 | 3/2008 | Labrou et al. |
| 7,382,881 B2 | 6/2008 | Uusitalo et al. |
| 7,403,775 B2 | 7/2008 | Patel et al. |
| 7,626,951 B2 | 12/2009 | Croy et al. |
| 2001/0025377 A1 | 9/2001 | Hinderks |
| 2002/0128029 A1 | 9/2002 | Nishikawa et al. |
| 2002/0146110 A1 | 10/2002 | Fromm |
| 2002/0150094 A1 | 10/2002 | Cheng et al. |
| 2002/0154745 A1 | 10/2002 | Shtivelman |
| 2002/0159600 A1 | 10/2002 | Weiner |
| 2002/0184368 A1 | 12/2002 | Wang |
| 2003/0027566 A1 | 2/2003 | Weiner |
| 2003/0028632 A1 | 2/2003 | Davis |
| 2003/0099198 A1 | 5/2003 | Kiremidjian et al. |
| 2003/0126162 A1 | 7/2003 | Yohe et al. |
| 2003/0186722 A1 | 10/2003 | Weiner |
| 2004/0017905 A1 | 1/2004 | Warrier et al. |
| 2004/0019539 A1 | 1/2004 | Raman et al. |
| 2004/0074448 A1 | 4/2004 | Bunt et al. |
| 2004/0090959 A1 | 5/2004 | Cinghita et al. |
| 2004/0095900 A1 | 5/2004 | Siegel |
| 2004/0117722 A1 | 6/2004 | Harada |
| 2004/0192353 A1 | 9/2004 | Mason et al. |
| 2004/0192378 A1 | 9/2004 | Wulkan |
| 2004/0252679 A1 | 12/2004 | Williams et al. |
| 2004/0255148 A1 | 12/2004 | Monteiro et al. |
| 2004/0258220 A1 | 12/2004 | Levine et al. |
| 2005/0021819 A1 | 1/2005 | Kilkki |
| 2005/0025308 A1 | 2/2005 | Tischer et al. |
| 2005/0030932 A1 | 2/2005 | Kelly et al. |
| 2005/0037706 A1 | 2/2005 | Settle |
| 2005/0053033 A1 | 3/2005 | Kelly et al. |
| 2005/0102358 A1 | 5/2005 | Gold et al. |
| 2005/0135333 A1 | 6/2005 | Rojas |
| 2005/0144247 A1 | 6/2005 | Christensen et al. |
| 2005/0160345 A1 | 7/2005 | Walsh et al. |
| 2005/0202807 A1 | 9/2005 | Ayyasamy |
| 2005/0207487 A1 | 9/2005 | Monroe |
| 2005/0215228 A1 | 9/2005 | Fostick et al. |
| 2005/0220137 A1 | 10/2005 | Prigent et al. |
| 2005/0259682 A1 | 11/2005 | Yosef et al. |
| 2005/0288101 A1 | 12/2005 | Lockton et al. |
| 2006/0007943 A1 | 1/2006 | Fellman |
| 2006/0045038 A1 | 3/2006 | Kay et al. |
| 2006/0059267 A1 | 3/2006 | Cugi et al. |
| 2006/0059342 A1 | 3/2006 | Medvinsky et al. |
| 2006/0093304 A1 | 5/2006 | Battey et al. |
| 2006/0107285 A1 | 5/2006 | Medvinsky |
| 2006/0146822 A1 | 7/2006 | Kolakowski et al. |
| 2006/0187897 A1 | 8/2006 | Dabbs et al. |
| 2006/0189305 A1 | 8/2006 | Ando et al. |
| 2006/0212582 A1 | 9/2006 | Gupta et al. |
| 2006/0212592 A1 | 9/2006 | Gupta et al. |
| 2006/0224748 A1 | 10/2006 | Gupta et al. |
| 2006/0244588 A1 | 11/2006 | Hannah et al. |
| 2006/0245367 A1 | 11/2006 | Jeffery et al. |
| 2006/0248149 A1* | 11/2006 | Kraft et al. ............ 709/206 |
| 2006/0253599 A1 | 11/2006 | Monteiro et al. |
| 2006/0268750 A1 | 11/2006 | Weiner |
| 2006/0274698 A1 | 12/2006 | Twitchell |
| 2006/0276714 A1 | 12/2006 | Holt et al. |
| 2006/0282544 A1 | 12/2006 | Monteiro et al. |
| 2006/0288391 A1 | 12/2006 | Puthiyedath |
| 2006/0294259 A1 | 12/2006 | Matefi et al. |
| 2007/0001869 A1 | 1/2007 | Hunzinger |
| 2007/0180032 A1 | 8/2007 | Pearson |
| 2007/0182819 A1 | 8/2007 | Monroe |
| 2007/0207785 A1 | 9/2007 | Chatterjee et al. |
| 2008/0000979 A1 | 1/2008 | Poisner |
| 2008/0002621 A1 | 1/2008 | Ginzburg et al. |
| 2008/0002691 A1 | 1/2008 | Qi et al. |
| 2008/0086700 A1 | 4/2008 | Rodriguez et al. |
| 2008/0134054 A1 | 6/2008 | Clark et al. |
| 2008/0147910 A1* | 6/2008 | Hibbard et al. ............ 710/29 |
| 2009/0063698 A1 | 3/2009 | Xu et al. |
| 2009/0175425 A1 | 7/2009 | Lee |

FOREIGN PATENT DOCUMENTS

| | | |
|---|---|---|
| WO | WO 2006/114673 | 11/2006 |
| WO | WO 2007/026320 | 3/2007 |
| WO | WO 2007/081929 | 7/2007 |

OTHER PUBLICATIONS

"Eudora," Answers.com, http://www.answers.com/topic/eudora-e-mail-client, Downloaded on Aug. 20, 2009, 4 pages.

"The Eudora Open Messaging Advantage," Qualcomm, 1997, Part No. 100-50030-1, 23 pages.

"Aspera—Next Generation File Transport—Broadcasting & Entertainment Media," Asperasoft.com, http://www.asperasoft.com/en/industries/digital_media_10/Broadcast_Entertainment_Media_5, Downloaded on Sep. 22, 2009, 2 pages.

"Aspera—Next Generation File Transport—fasp™ transfer times," Asperasoft.com, http://www.asperasoft.com/en/technology/fasp_transfer_times_14/fasp_transfer_times_14, Downloaded on Sep. 22, 2009, 1 page.

"Aspera—Next Generation File Transport—the fasp solution," Asperasoft.com, http://www.asperasoft.com/en/technology/fasp_ solution_3/the_fasp_solution_3, Downloaded on Sep. 22, 2009, 3 pages.
"*Aspera—Next Generation File Transport—the shortcomings of TCP file transfer,*" Asperasoft.com, http://www.asperasoft.com/en/technology/shortcomings_of_TCP_2/the_shortcomings_of_TCP_file_transfer_2, Downloaded on Sep. 22, 2009, 2 pages.
"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.
"*Aspera fasp™ High Speed Transport—A Critical Technology Comparison,*" White Paper, Asperasoft.com, http://www.asperasoft.com/en/technology/white_papers_13/aspera_fasp_high_speed_transport_13, Downloaded on Sep. 22, 2009, 11 pages.
"*Palringo Brings First Push-to-Talk Application to the iPhone,*" RedOrbit.com, http://www.redorbit.com/news/technology/1525545/palringo_brings_first_pushtotalk_application_to_the_iphone/index.html, Downloaded on Aug. 13, 2009, 2 pages.
*Palringo—Features,* Palringo.com, http://www.palringo.com/en/gb/features/, Downloaded on Aug. 13, 2009, 1 page.
Moren, Dan, "*Palringo Brings Picture Messaging to Iphone,*" http://www.pcworld.com/article/149108/palringo_brings_picture_messaging_to_iphone.html, Downloaded on Aug. 13, 2009, 3 pages.
Paul, Ryan, "*Gmail gets Google Talk integration,*"Arstechnica.com, http://arstechnica.com/old/content/2006/02/6128.ars , Downloaded on Aug. 20, 2009, 1 page.
Sherman, Chris, "*Google Integrates Chat with Gmail,*"Search Engine Watch, http://searchenginewatch.com/3583121, Feb. 7, 2006, Downloaded on Aug. 20, 2009, 2 pages.
"*About Gmail,*" http://mail.google.com/mail/help/chat.html, Downloaded on Aug. 20, 2009, 3 pages.
WikiPedia—The Free Encyclopedia, "*Google Talk,*" http://en.wikipedia.org/wiki/Google_Talk, Downloaded on Aug. 20, 2009, 8 pages.
Azuri, Calvin, "*Pairing Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages
Liaw, Kim Poh, "*Pairing launches its IM Software for Android Phones,*" Slashphone.com, Mar. 24, 2009, http://www.slashphone.com/palringo-launches-its-im-software-for-android-phones-245111, Downloaded on Aug. 13, 2009, 8 pages.
WikiPedia—The Free Encyclopedia, "*Palringo*" http://en.wikipedia.org/wiki/Palringo, Downloaded on Aug. 13, 2009, 1 page.
"*Dircproxy,*" http://home.pcisys.net/~tbc/hacks/dircproxy.htm, Downloaded on Sep. 26, 2008, 1 page.
Apple Inc., "*iPhone User's Guide,*" http://manuals.info.apple.com/en_US/iPhone_User_Guide.pdf, Downloaded on Oct. 3, 2008, 154 pages.
Brandx.net, "*Using Talk,*" http://www.brandx.net/support/usingtelnet/talk.shtml, Downloaded on Sep. 19, 2008, 2 pages.
Businesswire.com "*LignUp 4.0 Delivers Industry's Most Comprehensive Suite of Communications Web Services,*" http://www.businesswire.com/portal/site/google/index.jsp?ndmViewId=news view&newsId=20070430005498&newsLang=en, Downloaded on Nov. 21, 2008, 10 pages.
Calore, Michael, "*SpinVox Moves Into VoIP, Brings Voice-to-Text to Skype Users,*" Monkey_Bites, http://blog.wired.com/monkeybites/2007/08/spinvox-moves-i.html, Downloaded on Oct. 3, 2008, 4 pages.
Cardci et al., "*MAC Layer QoS Support for Wireless Networks of Unmanned Air Vehicles,*" Proceedings of the 37th Hawaii International Conference on System Sciences—2004, Jan. 5-8, 2004 pp. 9 pp.
Charny, Ben, "*Nextel pushes new 'push to talk' features,*" URL: http://news.zdnet.com/2100-9584_22-134945.html, Mar 18, 2004, 3 pages.
Chen et al., "*An Adaptive Multimedia Transmission Protocol for Distributed Multimedia Applications,*" Proceedings of the 5th International Workshop on Multimedia Network Systems and Applications (MNSA'2003), in conjunction with the 23rd International Conference on Distributed Computing Systems (ICDCS-2003), 6 pages.

Dannen, Chris, "*Technology: The Skype Mobile Phone Will Blow Your Mind,*" Dec. 18, 2007, URL: http://www.fastcompany.com/blog/chris-dannen/lab/technology-skype-mobile-phone-will-blow-your-mind, 2 pages.
Erwu et al., "*Packet-late indication based (PLIB): adaptive jitter buffer,*" ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.
FAQS.org, "*RFC1644—T/TCP—TCP Extensions for Transactions Functional S,*" http://www.faqs.org/rfcs/rfc1644.html, Downloaded on Sep. 19, 2008, 26 pages.
FluidVoice "*Overview of FluidVoice,*" http://viral.media.mit.edu/wiki/tiki-index.php?page=FluidVoice, Downloaded on Sep. 16, 2008, 2 pages.
GrandCentral.com, "*Call Record,*" http://www.grandcentral.com/howitworks/call_record, Downloaded on Sep. 26, 2008, 1 page.
GrandCentral.com, "*One Voicemail Box,*" http://www.grandcentral.com/home/one_voicemail, Downloaded on Sep. 26, 2008, 1 page.
GrandCentral.com, "*So Many Features, You Won't Believe it,*" http://www.grandcentral.com/support/howitworks/, Downloaded on Sep. 26, 2008, 1 page.
GrandCentral.com, "*Voicemail forwarding,*" http://www.grandcentral.com/howitworks/voicemail_forwarding, Downloaded on Sep. 26, 2008, 1 page.
Henshall, Stuart, "*HotRecorder—Record Skype Calls,*" Skype Journal, URL: http://skypejournal.com/blog/archives/2005/03/hotrecorder_rec.php, Mar. 25, 2005, 11 pages.
IRCHelp.org, "*An IRC Tutorial,*" http://www.irchelp.org/irchelp/irctutorial.html, Downloaded on Sep. 26, 2008, 14 pages.
Kadoink.com, "*Get a Widget,*" http://www.kadoink.com/index.cfm?action=getWidgets, Downloaded on Sep. 19, 2008, 3 pages.
Krishnan et al., "*EVRC-Wideband: The New 3GPP2 Wideband Vocoder Standard,*" IEEE International Conference on Acoustics, Speech and Signal Processing, 2007. ICASSP 2007, Publication Date: Apr. 15-20, 2007, vol. 2, on pp. II-333-II-336, Honolulu, HI.
Layton, Julia, "*How Slingbox Works,*" Jan. 4, 2006, HowStuffWorks.com, http://electronics.howstuffworks.com/slingbox.htm, 9 pages.
LignUp.com, "*LignUp Communications Applications Server,*" http://www.lignup.com/platform/index.html, Downloaded on Sep. 19, 2008, 1 page.
Network Dictionary, "*Instant Message (IM) Technology Overview,*" http://www.networkdictionary.com/networking/im.php, Downloaded on Sep. 16, 2008, 2 pages.
Nikotalkie.com, "*Nikotalkie—Home,*" http://www.nikotalkie.com/, Downloaded on Sep. 19, 2008, 2 pages.
Nikotel.com, "*Click-Pop-Talk WebStart Phone,*" http://www.nikotel.com/nikotel-click-pop-talk-java-phone.html, Downloaded on Sep. 19, 2008, 1 page.
Notaras, George, "*dircproxy IRC Proxy,*" http://www.g-loaded.eu/2007/02/01/dircproxy-irc-proxy/, Downloaded on Sep. 26, 2008, 4 pages.
Pash, Adam, "*Consolidate Your Phones with GrandCentral,*" http://techgroup.groups.vox.com/library/post/6a00cd978d0ef7f9cc00e398b8ff7a0002.html, Downloaded on Sep. 19, 2008, 5 pages.
Patel, Nilay, "*Apple patent reveals data-to-voice translation system for cellphones,*" Jul 28, 2007, URL: http://www.engadget.com/2007/07/28/apple-patent-reveals-data-to-voice-translation-system-for-cellph/, 5 pages.
Piecuch et al., "*A Selective Retransmission Protocol for Multimedia on the Internet,*" In Proceedings of SPIE Multimedia Systems and Applications, Nov. 2000, Boston MA, USA, 12 pages.
Qiao et al., "*SCTP Performance Issue on Path Delay Differential,*" Lecture Notes in Computer Science, Springer Berlin / Heidelberg ISSN 0302-9743 (Print) 1611-3349 (Online) vol. 4517/2007, Wired/Wireless Internet Conunications, pp. 43-54 Sunday, Jun. 24, 2007.
Ramo et al., "*On comparing speech quality of various narrow- and wideband speech codecs,*" Proceedings of the Eighth International Symposium on Signal Processing and Its Applications, 2005. Publication Date: Aug. 28-31, 2005, vol. 2, on pp. 603-606.

Rey et al., "I-D ACTION:draft-ietf-avt-rtp-retransmission-09.txt," Aug. 5, 2003, http://osdir.com/ml/ietf.avt/2003-08/msg00003.html, Downloaded on Sep. 19, 2008, 2 pages.
Ribbit.com, "*Amphibian*," http://www.ribbit.com/everyday/, Downloaded on Sep. 26, 2008, 1 page.
Ribbit.com, "*Enhanced Visual Voicemail*," http://www.ribbit.com/everyday/tour/enhanced_visual_voicemail.php, Downloaded on Sep. 26, 2008, 2 pages.
Ribbit.com, "*What is Ribbit? Features*," http://www.ribbit.com/platform/features.php, Downloaded on Sep. 26, 2008, 1 page.
Ribbit.com, "*What is Ribbit? Overview*," http://www.ribbit.com/platform/index.php, Downloaded on Sep. 26, 2008, 1 page.
Ribbit.com, "*What is Ribbit? Voice Architecture*," http://www.ribbit.com/platform/architecture.php, Downloaded on Sep. 26, 2008, 2 pages.
Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.
Skype.com, "*Making calls is just the start*," URL: http://www.skype.com/features/, Downloaded on Sep. 16, 2008, 2 pages.
Spinvox.com, "*Home Page*," http://www.spinvox.com/, Downloaded on Sep. 26, 2008, 3 pages.
Spinvox.com, "*How Does it Work?*," http://www.spinvox.com/how_it_works.html, Downloaded on Sep. 19, 2008, 2 pages.
Swissvoice.net, "*PSTN*," http://www.swissvoice.net/ww/htm_ww/08_technology/content_pstn.html, Downloaded on Sep. 19, 2008, 3 pages.
Tektronix, "*VOIP Technology Overview; Protocols, Convergence, Testing*," http://www.tektronics.com/voip, May 12, 2006.
The Jabber Extensible Communications Platform™, "*Products // Jabber XCP*," URL,: http://www.jabber.com/CE/JabberXCP, Downloaded on Sep. 16, 2008, 2 pages.
ThunkDifferent.com, "*YouMail vs. Google Grandcentral Voice Mail Service*," http://thunkdifferent.com/2007/10/11/youmail-vs-google-grandcentral-voice-mail-service/, Downloaded on Oct. 3, 2008, 6 pages.
VOIP-News.com, "*Company Profile, LignUp*," http://www.voip-news.com/vendors/lignup/, Downloaded on Dec. 5, 2008, 6 pages.
WikiBooks, "*Internet Technologies/IRC*," http://en.wikibooks.org/wiki/Internet_Technologies/IRC, Downloaded on Sep. 19, 2008, 4 pages.
WikiPedia—The Free Encyclopedia, "*E-mail*," http://en.wikipedia.org/wiki/E-mail, Downloaded on Sep. 19, 2008, 8 pages.
WikiPedia—The Free Encyclopedia, "*Internet Relay Chat*," http://en.wikipedia.org/wiki/Internet_Relay_Chat, Downloaded on Oct. 3, 2008, 11 pages.
WikiPedia—The Free Encyclopedia, "*Spinvox*," http://en.wikipedia.org/wiki/Spinvox, Downloaded on Sep. 26, 2008, 1 page.
WikiPedia—The Free Encyclopedia, "*TiVo*," http://en.wikipedia.org/wiki/TiVo, Downloaded on Sep. 19, 2008, 6 pages.
Yavuz et al., "*VoIP over cdma2000 1xEV-DO Revision A*," IEEE Communications Magazine, Feb. 2006, pp. 88-95.
HotRecorder.com, "*Features*," http://www.hotrecorder.com/music_features.asp, downloaded on Sep. 26, 2008, 1 page.
HotRecorder.com, "*Help*," http://www.hotrecorder.com/music_help.asp, downloaded on Sep. 26, 2008, 3 pages.
HotRecorder.com, "*FAQs*," http://www.hotrecorder.com/music_support.asp, downloaded on Sep. 26, 2008, 1 page.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Skype Protocol*," http://en.wikipedia.org/wiki/Skype, Downloaded on Sep. 26, 2008, 4 pages.
Jabber.org, "*Main page*," http://www.jabber.org/web/main_page, Sep. 2, 2008, downloaded on Sep. 26, 2008, 1 page.
Jabber.org, "*FAQ*," http://www.jabber.org/web/faq, Sep. 4, 2008, downloaded on Sep. 26, 2008, 2 pages.
Apple Inc., "*iPhone: About Visual Voicemail*," http://www.support.apple.com/kb/HT1486, Downloaded on Sep. 26, 2008, 3 pages.
Jabber.org, "*Products // Jabber XCP // Benefits*," http://www.jabber.com/CE/JabberXCPBenefits, downloaded on Sep. 26, 2008, 1 page.
Jabber.org, "*Products // Jabber Clients*," http://www.jabber.com/CE/JabberClients, downloaded on Sep. 26, 2008, 1 page.
Jabber.org, "*Products // JabberNow*" http://www.jabber.com/CE/JabberNow, downloaded on Sep. 26, 2008, 1 page.
KillerStartups.com, "*Kadoink.com—Mobilizing your Socializing*," http://www.killerstartups.com/Web20/kadoink-com-moblizing-your-socializing, Downloaded on Sep. 26, 2008, 3 pages.
CNETNews.com, "*Kadoink's phonecast lines officially open for texting*," http://news.cnetcom/8301-17939_109-9829877-2.html, downloaded on Sep. 26, 2008, 1 page.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
VOIP-News.com, "*Company Profile—LignUp*," http://www.voip-news.com/vendors/lignup/, Downloaded on Oct. 3, 2008, 6 pages.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
WikiPedia—The Free Encyclopedia, "*Push To Talk*" http://en.wikipedia.org/wiki/Push_to_talk, Downloaded on Sep. 26, 2008, 3 pages.
WikiPedia—The Free Encyclopedia, "*Slingbox*" http://en.wikipedia.org/wiki/Slingbox, Downloaded on Sep. 26, 2008, 4 pages.
About.com, "*Linux / Unix Command: talk*,"http://linux.about.com/od/commands/l/blcmdlI_talk.htm, Downloaded on Sep. 26, 2008, 2 pages.
Fall, Kevin, "*A Delay-Tolerant Network Architecture for Challenged Internets*," Feb. 2003, http://www.dtnrg.org/docs/papers/IRB-TR-03-003.pdf, 15 pages.
Chuah et al., "*Store-and-Forward Performance in a DTN*," Vehicular Technology Conference, 2006. VTC 2006—Spring. IEEE $63^{rd}$, Publication Date:May 7-10, 2006, vol. 1, on pp. 187-191.
Krishnan, et al., "*The SPINDLE Disruption-Tolerant Networking System*," Military Communications Conference, 2007. MILCOM 2007. IEEE Volume , Issue , Oct. 29-31, 2007 pp.1-7.
WikiPedia—The Free Encyclopedia, "*Visual Voicemail*" http://en.wikipedia.org/wiki/Visual_voicemail, downloaded on Sep. 26, 2008, 1 page.
Amir et al., "*An Overlay Architecture for High Quality VoIP Streams*,", IEEE Transactions on Multimedia, Publication Date: Dec. 2006, vol. 8, Issue:6, on pp. 1250-1262.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.
Baset et al., "*An Analysis of the Skype Peer-to-Peer Internet Telephony Protocol*," INFOCOM 2006. 25th IEEE International Conference on Computer Communications. Proceedings (2006), pp. 1-11.
Cerf et al., "*A Protocol for Packet Network Intercommunication*," Communications, IEEE Transactions on, vol. 22, Issue 5, May 1974 pp. 637-648.
"*YouMail Features*," YouMail.com, 2006-2009, 9 pages.
"*Visual Voice Mail From Verizon Wireless Gives Customers a New Way to Manage Their Messages*," Aug. 11, 2008, http://news.vzw.com/news/2008/08/pr2008-08-11.html, 2 pages.
"*iPhone: About Visual Voicemail*," Jul. 10, 2008, http://support.apple.com/kb/HT1486, 3 pages.
"*Visual Voicemail*," Wikipedia, the Free Encyclopedia, http://en.wikipedia.org/wiki/Visual_voicemail, downloaded on Oct. 27, 2009, 2 pages.
"*Google Voice*," Wikipedia, the Free Encyclopedia, http://en.wikipedia.org/wiki/Google_voice, downloaded on Oct. 27, 2009, 7 pages.
Rao, Leena, "*GrandCentral to (Finally) Launch As Google Voice. It's Very, Very Good*," Mar. 11, 2009, Techcrunch.com, http://techcrunch.com/2009/03/11/grand-central-to-finally-launch-as-google-voice-its-very-very-good/, 2 pages.
"*Google Voice Help*," 2009, Google.com, 2 pages.

\* cited by examiner

VOICE AND TEXT MAIL APPLICATION FOR COMMUNICATION DEVICES

CROSS-REFERENCE TO RELATED APPLICATIONS

This application claims the benefit of priority to U.S. Provisional Patent Application Nos. 61/256,866 filed Oct. 30, 2009 and 61/259,094 filed Nov. 6, 2009, both entitled "Voice and Text Mail Application For Communication Devices," both of which are incorporated herein by reference for all purposes. This application is also a Continuation-in-Part (CIP) of co-pending U.S. patent application Ser. No. 12/028,400 entitled "Telecommunication and Multimedia Management Method and Apparatus," filed Feb. 8, 2008, which is incorporated by reference herein for all purposes.

BACKGROUND

1. Field of the Invention

This invention relates to communications, and more particularly, to a visual voice and text mail method and application capable of supporting both synchronous and asynchronous voice communication between communication devices.

2. Description of Related Art

In spite of being a mature technology, telephony has changed little over the years. Similar to the initial telephone system developed over a hundred years ago, a telephone call today still requires a circuit connection between the parties before voice can be transmitted. If a circuit connection is not established, for whatever reason, no communication can take place.

A known advancement in telephony is voice mail. If a call is made and the recipient does not answer the phone, then the call is "rolled-over" into a separate voice mail system, typically maintained on a voice mail server or an answering machine connected to the phone of the recipient. The telephone and voice mail systems, however, are not integrated. Rather, the voice mail services are "tacked-on" to the underlying phone system. The fact that the two systems are separate and distinct, and not integrated, creates a number of inconveniences and inefficiencies.

Consider a real-world situation where two parties wish to have a brief conversation. If party A makes a call while party B is busy, then after the phone rings numerous times, party A is eventually rolled over into the voice mail of party B. Only after listening to and navigating through the voice mail system, can party A leave a message. To retrieve the message, party B is required to call into the voice mail system, possibly listen to other messages first in the queue, before listening to the message left by party A. In reply, party B may call party A. If party A is busy, the above process is repeated. This sequence may occur multiple times as the two parties attempt to reach each other. Eventually one of the parties will place a call and a live circuit will be established. Only at this point is it possible for the two parties to engage in a live conversation. The difficulty and time wasted for the two parties to communicate through voice mail, as highlighted in this real-world example, is attributable to the fact that the telephone system and voice mail are two different systems that do not interoperate very well together.

With the advent of the Internet, telephony based on Voice over Internet Protocol or VoIP has become popular. Despite a number of years of development, VoIP services today are little different than traditional telephony. Add on services like voicemail, email notifications and phonebook auto-dialing, are all common with VoIP. The fundamental communication service of VoIP, however, remains the same. A party is still required to place a call and wait for a connection to be made. If the recipient does not answer, the call is rolled over into voice mail, just like conventional telephony. VoIP has therefore not changed the fundamental way people communicate.

Visual voice mail is a recent advancement in telephony. With visual voice mail, a list of received messages is visually presented on a display of a communication device of a recipient, such as a mobile phone. The recipient may select any of the messages in the list to either listen to or delete, typically by simply touching the display adjacent where the message appears. When a message is selected for review, the media of the message is immediately rendered, without the user having to either (i) dial-in to the voice mail system or (ii) listen to previously received messages in the queue. In various implementations of visual voice mail, the message selected for review either resides at and is locally stored on the communication device itself, or is retrieved from the mail server and then rendered. When a message is selected for deletion, the selected message is removed from the list appearing on the display and also possibly removed from storage, either on the communication device itself, the network, or both.

One current example of a product including visual voice mail is the iPhone by Apple Inc. of Cupertino, Calif. With visual voice mail on the iPhone, incoming messages are first received and stored on the voice mail server of a recipient. Once the message is received in full, the message is downloaded to the iPhone of the recipient and the recipient is notified. At this point, the recipient may review the message, or wait to review the message at an arbitrary later time. With visual voice mail on the iPhone, however, incoming voice messages can never be rendered "live" in a real-time rendering mode because the message must be received in full before it can be rendered.

YouMail is yet another example of an improvement over conventional email systems. YouMail provides a number of features, including visual voice mail, voice-to-text transcriptions of voicemails, a single inbox for both voice mails and emails, sharing or forwarding of voicemails via either email or instant messaging, and personalized greetings for different callers. Like visual voice mail on the iPhone, voice messages with YouMail can never be reviewed "live" by the recipient. Rather the voice messages must be received in full before the recipient can access the message from his/her inbox and render the message asynchronously.

"Google Voice" offers additional improvements to conventional email systems. With Google Voice, one telephone number may be used to ring multiple communication devices, such as the desktop office phone, mobile phone, and home phone of a user. In addition, Google Voice offers a single or unified voicemail box for receiving all messages in one location, as opposed to separate voicemail boxes for each communication device. Google Voice also offers a number of other features, such as accessing voice mails online over the Internet, automatic transcriptions of voice mail messages into text messages, the ability to create personalized greetings based on who is calling, etc. In addition, Google Voice also provides a recipient with the options to either (i) listen to incoming messages "live" as the media of the message is received (ii) or join the in a live conversation with the person leaving the message. With both options, the recipient can either listen live or enter a live conversation only at the current most point of the incoming message.

With Google Voice, however, the rendering options for reviewing incoming messages are limited. There is no ability to; (i) asynchronously review the previous portions of a message, behind the current most point, while the message is being left; (ii) seamlessly transition the review of an incoming message from an asynchronous time-shifted mode to a synchronous real-time mode after the asynchronous rendering of the media of the message has caught up to the "live" point of the incoming message; or (iii) reply to an incoming voice message with a text message, or vice versa, using a single unified communication application.

Another drawback to each of the voice mail systems mentioned above is that a circuit connection always must be established before the recipient of a message can reply with either a live voice conversation or another voice message. For example if a person would like to respond to a voice mail by speaking to the sender of the message, they are still required to dial the telephone number of the sender of the message. Alternatively, some visual voice mail systems have a "compose" feature, allowing the recipient to generate a reply message. Once the message is created, it may be transmitted. With either case, a circuit connection must be established, before the live conversation can take place or the composed message sent. With the live conversation reply alternative, the call is "rolled-over" into the voice mail system of the called party if a circuit connection cannot be established, and a voice mail message may be left once a circuit connection is established with the voice mail system. With the message option, a circuit connection has to be established with the voice mail system of the original sender before the message may be left.

SUMMARY OF THE INVENTION

A voice and text mail application method and apparatus capable of supporting both synchronous and asynchronous voice communication is described herein. The application is configured to (i) simultaneously and progressively store media of an incoming message as the media is received at a communication device over the network and (ii) provides a "catch up" rendering option which enables the rendering of previously received media of the message starting at any previous point of the message and to catch up the rendering to the current point or head of the message as the media of the message is being received. By rendering the previously received media of the incoming message out of storage at a rate faster relative to when the media of the incoming message was originally encoded, eventually the rendering will catch up and seamlessly transition the rendering from an asynchronous time-shifted mode out of storage to a synchronous mode as the media of the message is received over the network. In various alternative embodiments, the application also enables the (a) screening of the media of the incoming message as the media is received over the network; (b) the ability to join a live conversation with the sender of the incoming message as the media of the incoming message is received over the network, and/or (c) the option to ignore the media of the incoming message.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The term "media" as used herein is intended to broadly mean virtually any type of media, such as but not limited to, voice, video, text, still pictures, sensor data, GPS data, or just about any other type of media, data or information.

As used herein, the term "conversation" is also broadly construed. In one embodiment, a conversation is intended to mean a thread of messages, strung together by some common attribute, such as a subject matter or topic, by name, by participants, by a user group, or some other defined criteria. In another embodiment, the messages of a conversation do not necessarily have to be tied together by some common attribute. Rather one or more messages may be arbitrarily assembled into a conversation. Thus a conversation is intended to mean two or more messages, regardless if they are tied together by a common attribute or not.

A. SYSTEM ARCHITECTURE

Figure 1:
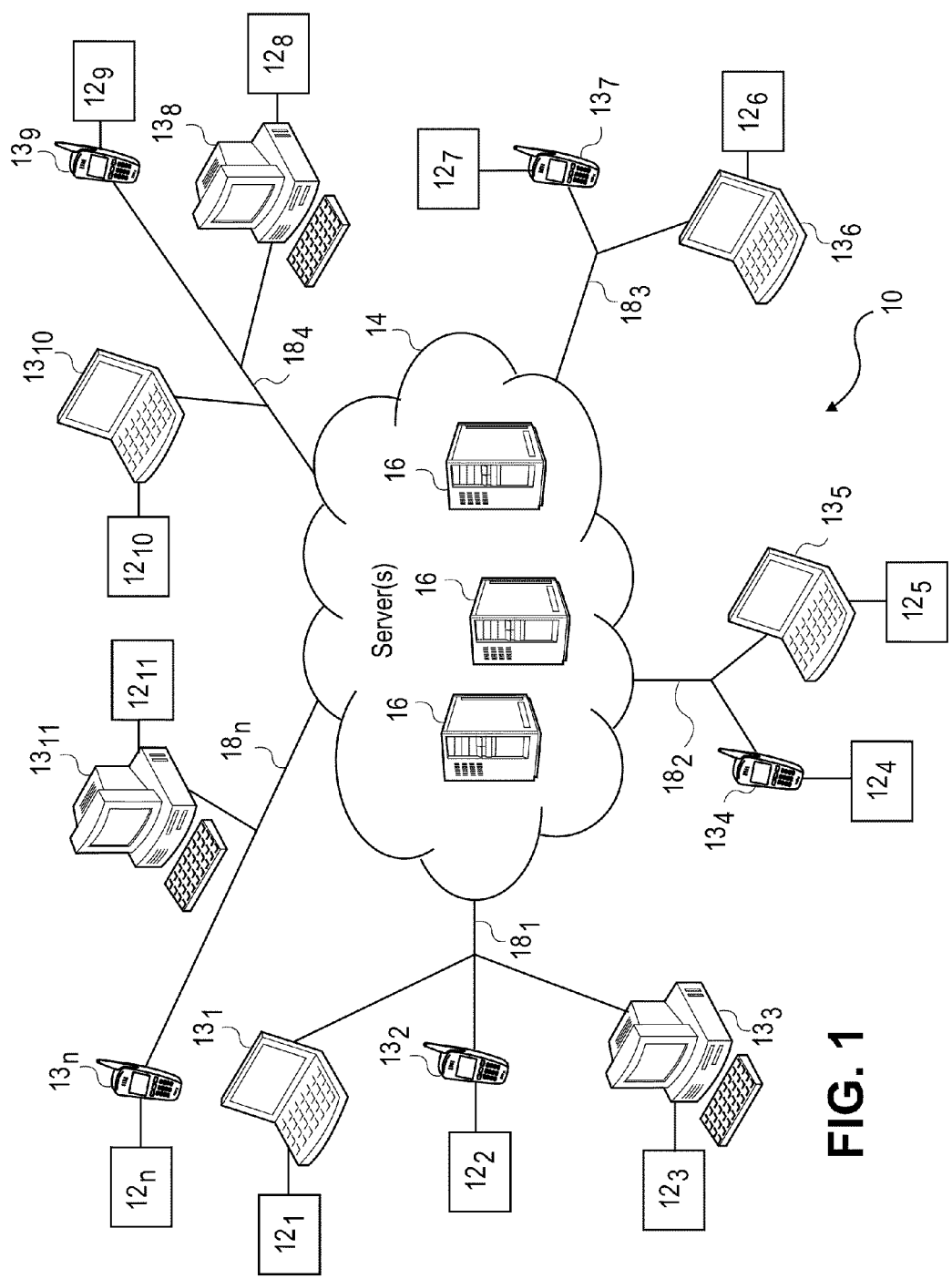
FIG. 1 is a block diagram of the telecommunication system according to the invention.

Referring to FIG. 1, a block diagram of the telecommunication system according to the invention is shown. The system 10 includes a plurality of client devices $13_1$ through $13_n$, each running a visual voice and text mail application $12_1$ through $12_n$ respectively. Although the application 12 on each device is illustrated external to each device 13, it should be understood that the application 12 is actually embedded in each device 13. The devices 13 communicate with one another over a communication services network 14, including one or more communication servers 16. One or more networks $18_1$ through $18_n$, is provided to couple the plurality of devices $13_1$ through $13_n$ to the communication services network 14 respectively. In various embodiments, the networks 18 may be the Public Switched Telephone Network (PSTN), a cellular network based on CDMA or GSM for example, the Internet, a Wi-Fi network, a tactical radio network, a satellite network, or any other type of wired or wireless communication network, or a combination thereof. The communication services network 14 is a network layer on top of or otherwise in communication with the various underlying networks $18_1$ through $18_n$. In different embodiments, the network layer 14 is either heterogeneous or homogeneous.

The visual mail applications $12_1$ through $12_n$ running on devices $13_1$ through $13_n$ communicate with one another and with servers 16 over the networks $18_1$ through $18_n$ and network 14 using individual message units, referred to herein as "Vox messages", which are described in detail below. Certain Vox messages are capable of transporting voice and text media as well as other media types. By sending Vox messages back and forth over the communication services network 14 and the networks 18, the users of the devices 13 may communicate with one another, either synchronously in a real-time "live" mode or asynchronously in a time-shifted messaging mode, and with the ability to seamlessly transition between the two modes.

B. VISUAL MAIL APPLICATION ARCHITECTURE

Figure 2:
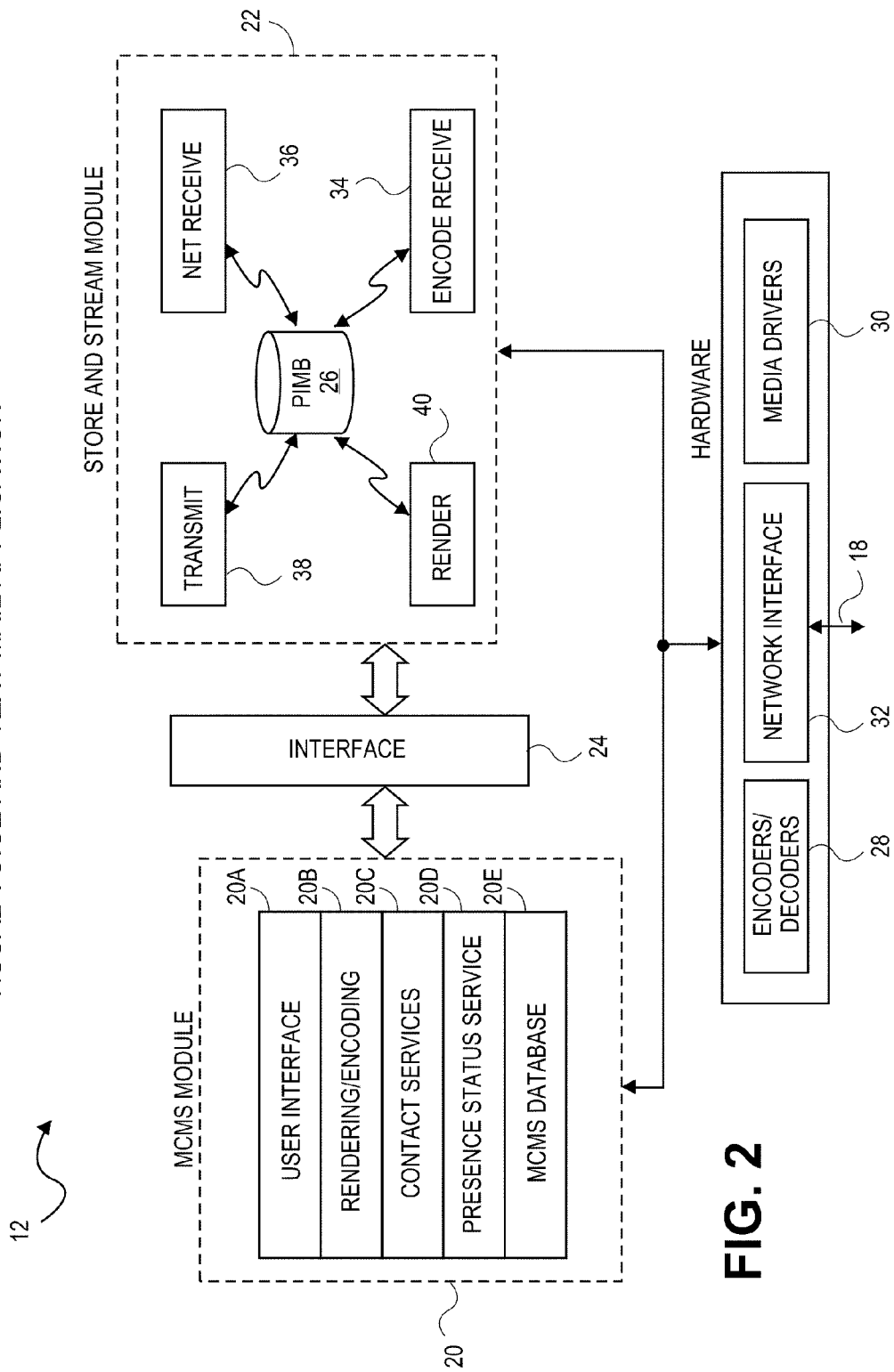
FIG. 2 is a diagram of a visual mail application running on client devices in the telecommunication system according to the invention.

Referring to FIG. 2, a block diagram of the architecture of the visual voice and text mail application 12 is shown. The application 12 includes a Multiple Conversation Management System (MCMS) module 20, a Store and Stream module 22, and an interface 24 provided between the two modules. In one embodiment, the MCMS module 20 and the Store and Stream module 22 communicate through interface 24 using an encapsulation format (e.g., JSON or XML) over a transport header protocol (e.g., Hypertext Transfer Protocol or HTTP). The application 12 functionally is similar to the client application described in U.S. application Ser. Nos. 12/028,400 (U.S. Publication No. 2009/0003558), 12/253, 833 (U.S. Publication No. 2009/0168760), 12/253,820 (U.S. Publication No. 20090168759) and 12/253,833 (U.S. Publication No. 2009/0168760), all incorporated by reference herein for all purposes. The individual modules are briefly described below. For more details, the above-listed, co-pending applications should be reviewed.

The MCMS module 20 includes a number of modules and services for creating, managing and conducting multiple conversations. The MCMS module 20 includes a user interface module 20A for supporting the audio and video functions on the device 13, rendering/encoding module 20B for performing rendering and encoding tasks, a contacts service 20C for managing and maintaining information needed for creating and maintaining contact lists (e.g., telephone numbers and/or email addresses), a presence status service 20D for both sharing the online status of the user of the device 13 as well as the online status of the other users on the network 14. The MCMS data base 20E stores and manages the meta data for messages and conversations conducted using the application 12 running on a device 13 as well as contact and presence status information. In alternative embodiments, the MCMS database 20E may be either a document-orientated or a relational database.

The Store and Stream module 22 includes a Permanent Infinite Memory Buffer or PIMB 26 for storing, in an indexed format, the media of received and sent messages. The store and stream module 22 also includes an encode-receive module 34, net receive module 36, transmit module 38 and a render module 40. The encode-receive module 34 performs the function of receiving, encoding, indexing and storing in the PIMB 26 media created using the application 12 on device 13 in a time-indexed format. The net receive module 36 performs the function of indexing and storing in the PIMB 26 the media contained in messages received from other devices 13 over the network 18 in the time-indexed format. The transmit module 38 is responsible for transmitting the media of messages created using the application 12 to other recipients over the network 18. The render module 40 enables the application 12 to render the media of messages on device 13, either synchronously in the near real-time mode or asynchronously in a time-shifted mode by retrieving and rendering the media stored in the PIMB 26.

The MCMS module 20 and the Store and Stream module 22 also each communicate with various hardware components provided on the device 13, including, but not limited to, encoder/decoder hardware 28, media drivers 30 and network interface 32. The encoder/decoder hardware 28 is provided for encoding the media, such as voice, text, video or sensor data, generated by a microphone, camera, keyboard, touch-sensitive display, etc. provided on or associated with the device 13 and decoding similar media before it is rendered on the device 13. Media drivers 30 are provided for driving the media generating components, such as speaker and/or a display (not illustrated) after the media has been decoded. A network interface is provided 32 for connecting device 13 running the application 12 to a network 18, either through a wireless or wired connection. Although not illustrated, the application 12 runs or is executed by the underlying processor embedded in device 13, such as a microprocessor or microcontroller.

In various embodiments, the duration of the media stored in the PIMB 26 may vary. In one embodiment, the storage may be permanent, meaning the stored media is available virtually forever or at least until the system runs out of storage. Various retention rates and strategies may be employed to make effective use of storage resources. Many possible implementations exist for the physical storage implementation of the PIMB 26, including, but not limited to: RAM, Flash memory, hard drives, optical media, or some combination thereof. The PIMB 26 is also "infinite" in size, meaning the amount of data that can be stored in the PIMB 26 is not inherently limited. This lack of limit is in comparison to existing jitter buffer technology that discards data as soon as it is rendered. In one specific embodiment, the PIMB 26 may be implemented using a small and relatively fast RAM cache memory coupled with a hard drive or other non-volatile memory for persistent storage. As the physical storage capacity of the PIMB 26 is exceeded, the media is maintained on a server 16 (as described below) for later retrieval on demand. User criteria or a replacement algorithm, such as least-recently-used, or first-in-last-out, is used to control the actual data stored in the PIMB 26, the data that is maintained on a server 16 or archived at any point in time. The PIMB 26 further provides the attributes of an indexed file storage system and the random access attributes of a database. The media of any number of conversations, regardless of the duration or the number of messages in each, may be stored in the indexed format for later retrieval and review. In addition, the certain meta data associated with the messages of a conversation, such as its originator and its length, may be also stored in the PIMB 26.

In alternative embodiments, the indexed media payloads and certain meta data can be stored for a designated period of time. Once the age of the media exceeds the designated period, the payloads and data are discarded. In another embodiment, payloads can be discarded based on the sender and/or the recipient of the message containing the payload, or the topic of the conversation or messages associated with the payload. In yet other embodiments, payloads and data may be marked for transience, meaning the messages will not be stored in the PIMB 26 beyond the requirements needed for immediate transmission or rendering.

As noted herein, the term "persistent" storage may have multiple meanings, depending on a specific implementation. With known existing "live" communication systems, media is transient, meaning if the media is stored at all, it is temporarily buffered until it is either transmitted or rendered. After being either transmitted or rendered, the media is irretrievably lost. Thus, the term persistent storage as used herein is intended to be broadly construed and mean the storage of media and meta data from indefinitely to any period of time longer than any transient storage needed to either transmit or render media "live" in real-time.

C. SERVER ARCHITECTURE

Each server 16 runs an application very similar to the application 12. The application running on the server(s) 16 include the MCMS module 20, the Store and Stream module 22, and interface 24 between the two modules 20, 22. The notable differences between the application running on the server(s) 16 and the application 12 is (i) the application on the server(s) 16 is configured to support many users (i.e., multiple tenants) of devises 13 running the application 12; (ii) the PIMB 26 on the server(s) 16 is typically much larger than on a communication device 13 since the servers support multiple users; and (iii) many of the user interface, media encoding and media rendering modules, such as encode-receive 34 and render 40, are not present because these functions and services are not performed on the network 14. For more details of the server application, see U.S. application Ser. Nos. 12/028, 400, 12/253,833, 12/253,820 and 12/253,833, all incorporated by reference herein for all purposes.

D. VOX MESSAGES AND MEDIA PAYLOADS

There are two types of Vox messages, including (i) messages that do not contain media and (ii) messages that do contain media. Vox messages that do not contain media are generally used for message meta data, such as media headers and descriptors, contacts information, presence status information, etc. The Vox messages that contain media are used for the transport of media.

Figure 3A:
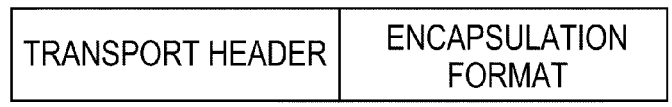
FIGS. 3A through 3C illustrate non-media data structures used in the visual mail application of the invention.
Figure 3B:
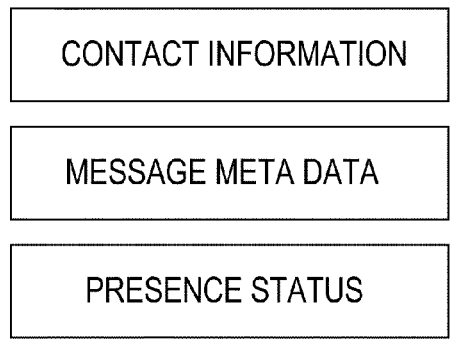

Referring to FIG. 3A, the data structure of a Vox message 50 that does not contain media is illustrated. The Vox message 50 includes an transport header field and an encapsulation format field for storing various objects, such as contact information, presence status information for the user of a device 13, or message meta data, as illustrated in FIG. 3B. It should be understood that the list of objects provided in FIG. 3B is not exhaustive. Other objects, such as but not limited to, user location update information, user log-in information, information pertaining to the authentication of users, statistical information, or any machine-to-machine type message, may also be encapsulated in the format filed of Vox messages 50.

Contact information includes the name, address (e.g., telephone number and/or email address), or other attributes for each of the contacts in the contact list of the user of a device 13 running application 12. The contact information is used to create contact lists, and to direct messages to intended recipients using the addressing information associated with the individual contacts in the contact list.

Message meta data provides application 12 level attributes for Vox messages 50. These attributes include a message identifier or ID, the identification of the message originator, a recipient list, and a message subject. The identifier information may be used for a variety of reasons, including, but not limited to, building contact lists and/or associating media with messages. The set of attributes for a given message may be extensible, and not all attributes necessarily need to be supported by all application 12 enabled devices 13.

Presence status information may identify the users that are currently authenticated by the system 10 and/or if a given user is reviewing a message live in the real-time mode or not. The presence data is therefore useful in determining, in certain embodiments, how messages are delivered across the networks 14 and 18. In situations where the presence status indicates an authenticated user is reviewing a message live for example, then a transport protocol optimized for timely (i.e., real-time) delivery may be used, whereas a transport protocol optimized for efficient delivery of messages may be used when the presence status indicate the authenticated user is not reviewing the message live.

Figure 3C:

Referring to FIG. 3C, a Vox message 52 that contains media is illustrated. The Vox message 52 is essentially the same as a non-media type Vox message 50, except it includes an additional field for media. The media field is capable of containing one or multiple media types, such as, but not limited to, voice, video, text, sensor data, still pictures or photos, GPS data, or just about any other type of media, or a combination thereof.

The transport header field in Vox messages 50 and 52 includes the seven layers of the Open System Interconnect Reference Model or OSI model, including from bottom to top: (i) a physical layer for media, signal and binary transmission; (ii) a data link for physical addressing, network, transport; (iii) a network layer for path determination and logical addressing; (iv) a transport layer for end-to-end connections and reliability; (v) a sessions layer for inter-host communication; (vi) a presentation layer for data presentation and encryption; and (vii) an application layer for interacting with the application 12 operating on device 13. Specifically, the information contained in the encapsulation format field is layered on top of the application layer of the transport header of each Vox message 50 or 52. As the seven layers of the OSI model are well known, a detailed explanation for each layer is not provided herein.

In various embodiments, the application layer may be HTTP, SMTP, SIP, or any other type of application layer. The encapsulation format may be JSON or XML or any other type of structured data serialization format. It should be noted that the specific transport headers and encapsulation formats as listed herein are merely exemplary. Any transport header or encapsulation format may be used, including new protocols developed in the future, or those currently known, but not listed herein.

By layering Vox messages 50 or 52 on top of the application layer, the messages are transmitted, and routed to a recipient, as is well known in the art. As a result, a new transport protocol for the application 12 is not needed. Instead, the system 10 takes advantage of current packet based communication networks running over the existing telecommunications infrastructure.

The information encapsulated in the format field of Vox messages is typically stored in the MCMS database 20E of the MCMS module 20. Alternatively, this information may be stored in the PIMB 26, or in both the MCMS database 20E and the PIMB 26.

When created or otherwise originated on a device 13 running application 12, the media of Vox messages 52 is progressively and simultaneously (i) stored in the PIMB 26 in an indexed format and (ii) placed into the packet payloads of the underlying transport layer protocol and streamed over the underlying network(s) to intended recipients. On the receive side, the incoming streaming media of Vox messages 52 is extracted from the incoming packets, and simultaneously and progressively stored in the indexed format in the PIMB 26 of the receiving device 13 as the media is received. If the receiving device 13 is in the synchronous or real-time mode, the render function 40 also progressively renders the incoming streaming media progressively and simultaneously as it is being received. Alternatively when in the time-shifted mode, the render function 40 may retrieve the received media from the PIMB 26 at an arbitrary later time, defined by the user of the receiving device 13. When media is retrieved from the PIMB 26 for rendering, the media is reviewed asynchronously in the time-shifted mode.

Since the media of both transmitted and received Vox messages 52 is stored in the PIMB 26 in the indexed format, the media of the messages may be retrieved and rendered at anytime. In addition, conversations may be constructed by threading together individual messages. As noted above, the messages of a conversation may be assembled using a defined attribute or in some other arbitrary way. Regardless of how the messages are assembled, a conversation may include messages of different types of media, such as both voice and text, as well as other media types, such as video, still pictures, sensor data, GPS data, or just about any other type of media, data or information. The messages of a conversation may also be rendered sequentially in time-indexed order, or one at a time in any order. Further by indexing messages, it is also possible to retrieve the media of a message starting at a particular offset. For example, if a message is 20 seconds long, it may be possible to retrieve and render the media of the message starting at an arbitrarily selected offset point of the message, and not always at the starting time of the message.

The ability to (i) progressively and store and transmit media as it is being created on the transmitting device 13 running application 12 and (ii) progressively store and render the media on the receiving devices 13 running application 12 allow the participants to converse in real-time, providing a user experience similar to a full-duplex telephone conversation. The storage of the media in the PIMB 26 allows the participants to participate in the conversation asynchronously in a time-shifted mode, providing a user experience similar to conventional messaging systems (e.g., email of SMS text messaging), but with the option of sending or receiving voice messages. In addition, the ability of the Vox messages 52 to carry multiple media types, it is also possible for the participants of a conversation to converse using different types of media. For example, a person may send a text message and receive a reply voice message, or vice versa.

The simultaneous and progressive storage of both transmitted media as it is being created or received media as it is being received enables a host of rendering options provided on the client 12 enabled devices 13. Such rendering options include, but are not limited to: pause, replay, play faster, play slower, jump backward, jump forward, catch up to the most recently received media or Catch up to Live (CTL), or jump to the most recently received media. As described in more detail below, the storage of media and certain rendering options allow the participants of a conversation to seamlessly transition a conversation from a time-shifted mode to the real-time mode and vice versa.

It is useful to note that the catch up to the most recently received media and CTL rendering options are very similar, but are not necessarily the same. With the catch up to the most recently received media option, the rendering of media out of the PIMB 26 at the faster rate occurs until the rendering has caught up to the most recently received media. In situations were the received media is not live, but rather for example is a recorded message that is being delivered to a recipient after it was initially recorded, then this feature allows the recipient to quickly review previously received portions of the message and then seamlessly merge into rendering the media of the message as it is received over the network. The CTL rendering option, on the other hand, requires the delivery of real-time media, as the sender creates the media. After the seamless transition occurs, the recipient is rendering the media "live" as it is being created and transmitted across the network 14, as opposed to the delivery of a previously recorded message.

Several examples below highlight the seamless transition of a conversation between the time-shifted and real-time modes:

(i) consider an example of a recipient receiving an incoming live message. If the recipient does not have their communication device 13 immediately available, for example because their cell phone is in their pocket or purse, then most likely the initial portion of the message will not be heard. But with the CTL rendering option, the recipient can review the media of the message out of the PIMB 26 from the start of the message faster than the media was originally encoded, while the message is still being received. Eventually, the rendering of the media at the increased rate will catch-up to the live point of the message, whereupon, there is a seamless transition from the asynchronous time-shifted mode to the real-time mode. After the seamless transition occurs, the parties may converse live, similar to a conventional phone call;

(ii) in an alternative example, a conversation may seamlessly transition from the real-time mode to the time-shifted mode. Consider a party participating in a real-time or "live" conference call among multiple parties. When the "pause" rendering option is selected, the "live" rendering of incoming media stops, thus seamlessly transitioning the participation of that party that selected the pause option from the real-time to time-shifted mode. After the pause, the party may rejoin the conversation "live" assuming it is still ongoing in the real-time mode. The "missed" media during the pause may be reviewed at any arbitrary later time in the time-shifted mode from the PIMB 26;

(iii) in another variation of the seamless transition from real-time to time-shifted, one party may elect to leave a live conversation while the other party continues speaking. When this situation occurs, a message can be left, which can be reviewed by the departing party at any arbitrary later time; and (iv) in yet another example, a recipient may receive a text message and elect to respond with a voice message, or vice-versa. When receiving the voice message, the parties may engage in either a "live" conversation in the real-time mode or asynchronously send voice and/or text messages back and forth in the time-shifted mode. Since other known communication platforms, at least at the core level, are typically dedicate to just one media type, the ability to converse with multiple media types, using a single or unified communication platform, is usually not possible.

Another unique aspect of the system 10 is that the media payloads generated by the visual mail application 12 running on a device 13 are stored in multiple locations. Not only are the payloads stored in the PIMB 26 of the transmitting and receiving devices 13, but also in a PIMB (not illustrated) of the server(s) 16 on the communication services network 14. This feature provides the system 10 with both resilience and operability, even when network conditions are poor or when a participant of a conversation is not connected to the network.

E. OPERATION

Figure 4A:
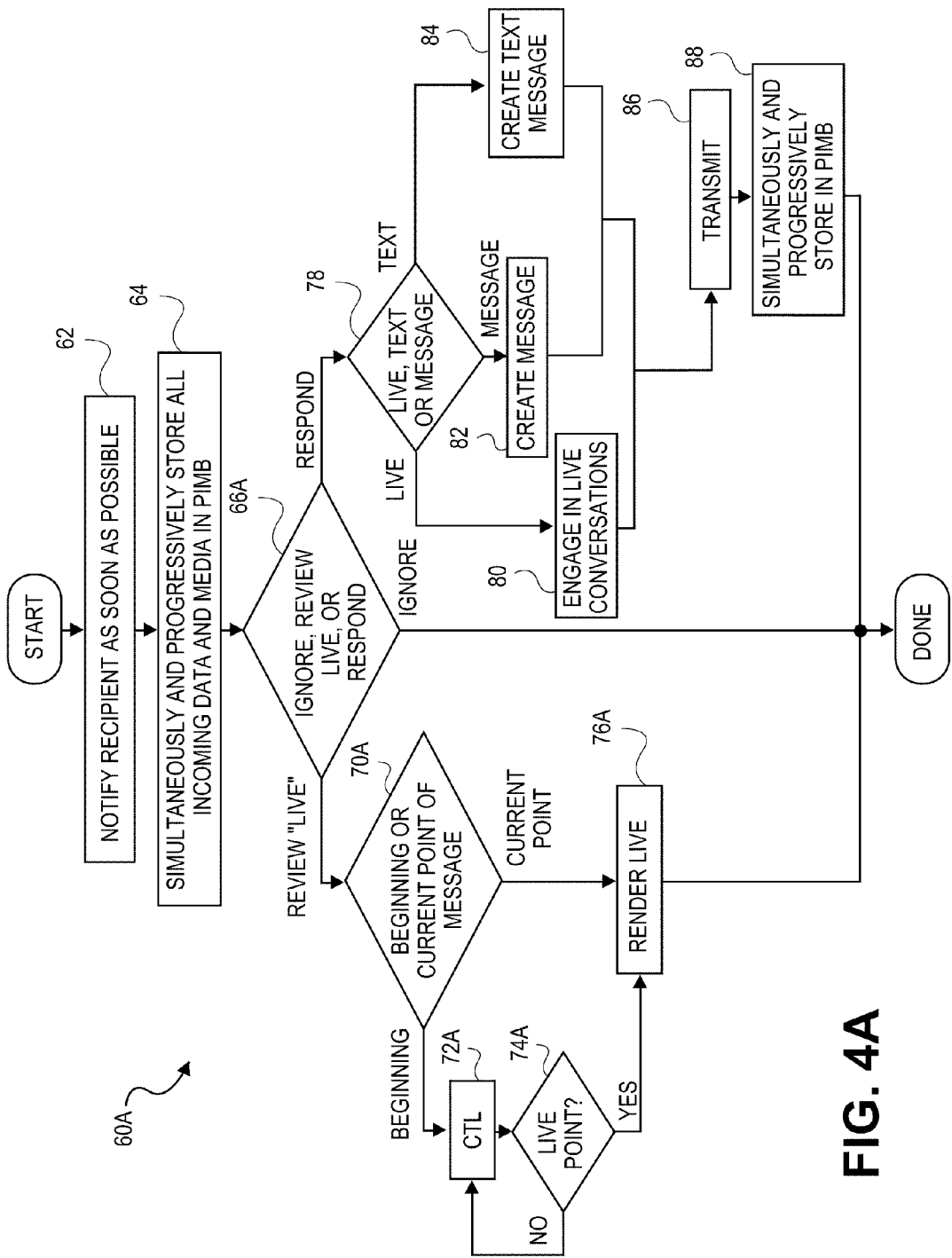
FIGS. 4A and 4B are flow diagrams illustrating the operational steps of the visual mail application of the invention.

Referring to FIG. 4A, a flow diagram 60A illustrating the operational steps of the application 12 in response to receiving an incoming "live" message is shown. In the initial step, a recipient is notified in step 62 as an incoming message is received. The notification therefore occurs before the message is received in full and preferably occurs as soon as possible, for example, when the meta data associated with the message is initially received, indicating that a sender is getting ready to or is in the process of sending a message. The notification may include, in accordance with various embodiments, a visual notification, an audio notification, or a combination of both. All incoming meta data and media is simultaneously and progressively stored as the media is received in the PIMB 26 of the receiving communication device 13, as provided in step 64. In response to the notification, the recipient has a number of options, as represented by the decision diamond 66A.

A first option is to simply ignore the message. When ignored, the recipient always has the option to retrieve and render the media of the message from the PIMB 26 at any later arbitrary time.

In a second option, the recipient may elect to review the incoming voice message in real-time or "live". When this choice is made, the recipient needs to decide (decision diamond 70A) if they wish to review the message from the beginning or from the current point in the message. If the beginning option is selected, then the CTL rendering function (step 72A) is implemented, causing the media to be retrieved from the PIMB 26 and rendered at a rate faster than when it was originally encoded. As the media is being rendered out of the PIMB 26, the application 12 continually measures (decision 74A) when the rendering out of the PIMB 26 at the faster rate has caught up to the live point of the message as it is being received. When the live point is reached, the rendering seamlessly transitions from the asynchronous rendering mode to the synchronous real-time mode (step 76A). Alternatively, if the recipient elects to review the incoming media at the current point of the message, then the media of the message is rendered live (step 76A) as it is received.

In a third option, the recipient may elect to respond to the incoming message either during or immediately after the message is received in full. As provided in decision 78, the recipient may elect to respond by engaging in a live conversation (step 80) with the sender of the incoming message, create a reply voice message (step 82), typically after reviewing the incoming media in full, or reply with a text message (step 84), also typically after reviewing the incoming message in full. With the first option, the parties will engage in a real-time conversation, providing a user experience similar to a full duplex telephone call. Whereas with the latter two options, the conversation is asynchronous, similar to most messaging systems. Regardless of which reply, the outgoing media is both simultaneously and progressively transmitted (step 86) and stored in the PIMB as the media is created (step 88).

It should be understood that the timing of any response could vary, depending on the discretion of the recipient. In one scenario, the recipient may wish to engage in a live conversation as soon as possible after receiving the notification, without first receiving any previous media associated with the incoming message. In a second scenario, the recipient may elect to first review the previous portion of the incoming message using the CTL rendering option, and then, join the conversation "live" after reaching the catch-up point. In yet another scenario, the recipient may elect to "screen" or review the incoming message "live", but not engage in a real-time conversation. When a message is screened, the sender is typically not notified that the recipient is reviewing the message as it is received. In an alternative embodiment however, the sender could be notified that the recipient is screening the message, but has elected not to engage in a live conversation. With another alternative, the recipient may initially ignore the message, review it at an arbitrary later time, and then reply, with either a voice or text message. At that point, the participants of the conversation may elect to continue the conversation in the asynchronous time-shifted mode, or may transition into the real-time mode.

Figure 4B:
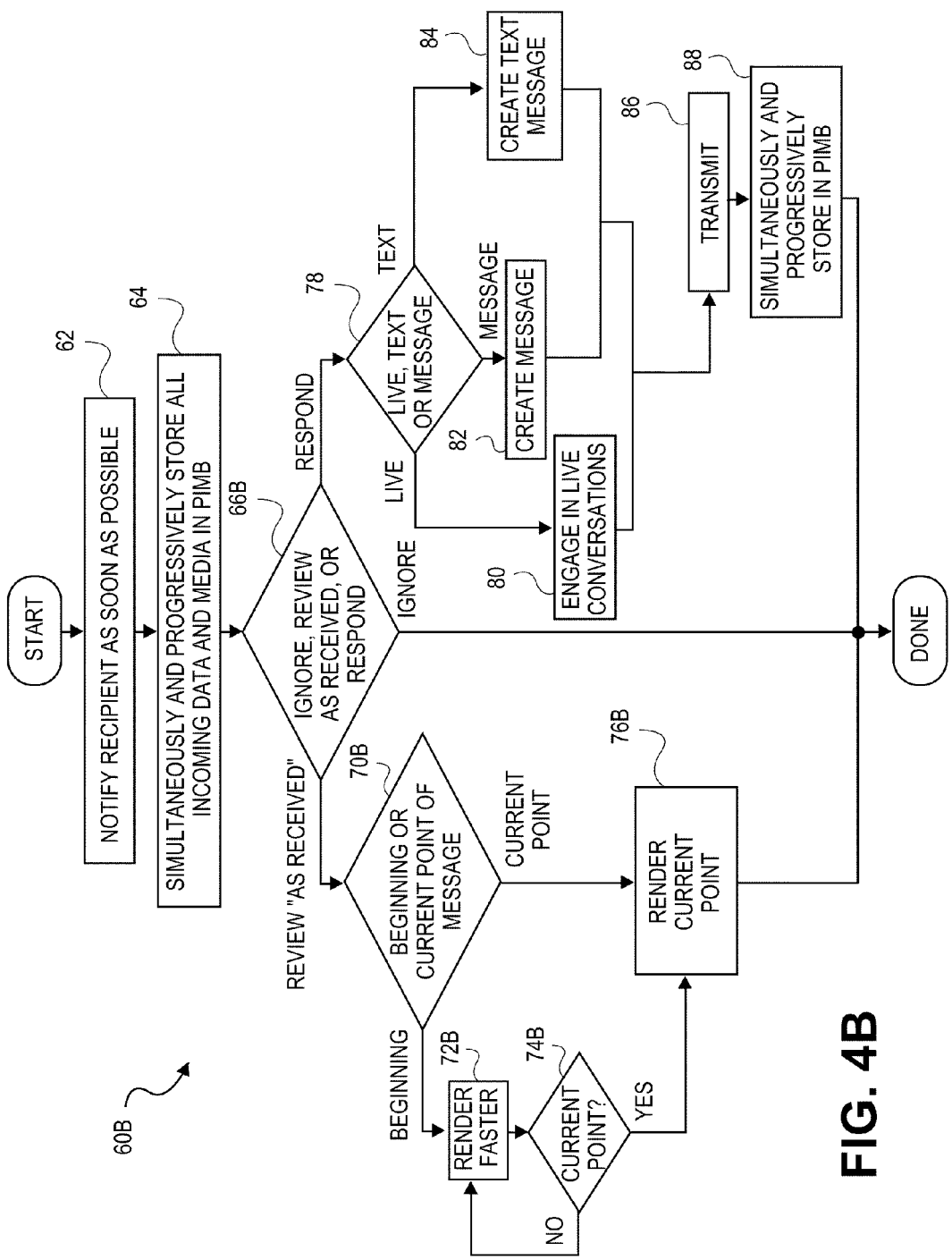

Referring to FIG. 4B, a flow chart 60B illustrating the catch up to the most recently received media of an incoming message. With this example, it is assumed that the incoming message is not being delivered "live", but rather was previously recorded before it was delivered to the recipient. The flow chart 60B is essentially the same as the flow chart 60A of FIG. 4A, but with several differences.

In decision diamond 66B, the recipient has the option of reviewing the incoming message as received. If this option is selected, then the recipient decides to review the incoming message either at the current point (step 76B) or at the beginning of the message (decision 70B). If from the beginning, then the previously received media of the message is rendered (step 72B) from the PIMB 26 at a rate faster than it was originally decoded. When the rendering at the media from the PIMB 26 at the faster rate catches up to the current point (decision 74B), then the rendering seamlessly transitions from the PIMB to the current point (step 76B) as the media of the message is received.

The recipient may also elect to either ignore the incoming message or respond. Either option is essentially the same as described above with regard to FIG. 4A, but with one minor exception. The recipient may try to engage in a "live" conversation (step 80) with the party who sent the prerecorded message. If the party is available and they wish to converse in real-time, then a live conversation may take place. On the other hand if the party is not available, or elects not to converse in real-time, then a live conversation will not take place.

The examples of FIGS. 4A and 4B illustrate the differences between the catch up to live and the catch up to the most recent media of an incoming message. In each case, media is rendered out of the PIMB 26 faster than it was originally encoded. When the faster rendering out of the PIMB catches up to the current most point of the message as it is being received, then with both rendering options, there is a seamless transition to rendering the media of the message as it is received over the network. Thus, the main difference between the two options is that with CTL, the media of the incoming message is being rendered "live" as the media is created and transmitted over the network, whereas with the catch up to the most recent media option, the media is not being created live.

F. EXAMPLES

FIGS. 5A through 5G are a series of screen shots of the display of a communication device 13 showing the operation of the visual voice and text mail application 12.

Figure 5A:
FIGS. 5A through 5G are a series of screen shots showing the operation of the visual mail application of the invention.

In the initial FIG. 5A, the display 90 on a device 13 used by a person named Jill is shown. The visual voice and text mail display 90 shows a number of messages, both text and voice, received by Jill. In this example, Jill has received text messages from her "Mom", "Poker Buddies", and the members of her "Weekly Status Meeting" at work. In addition, Jill has received voice mail messages from Dennis Jones, Matt Smith, and Judy Li.

Figure 5B:
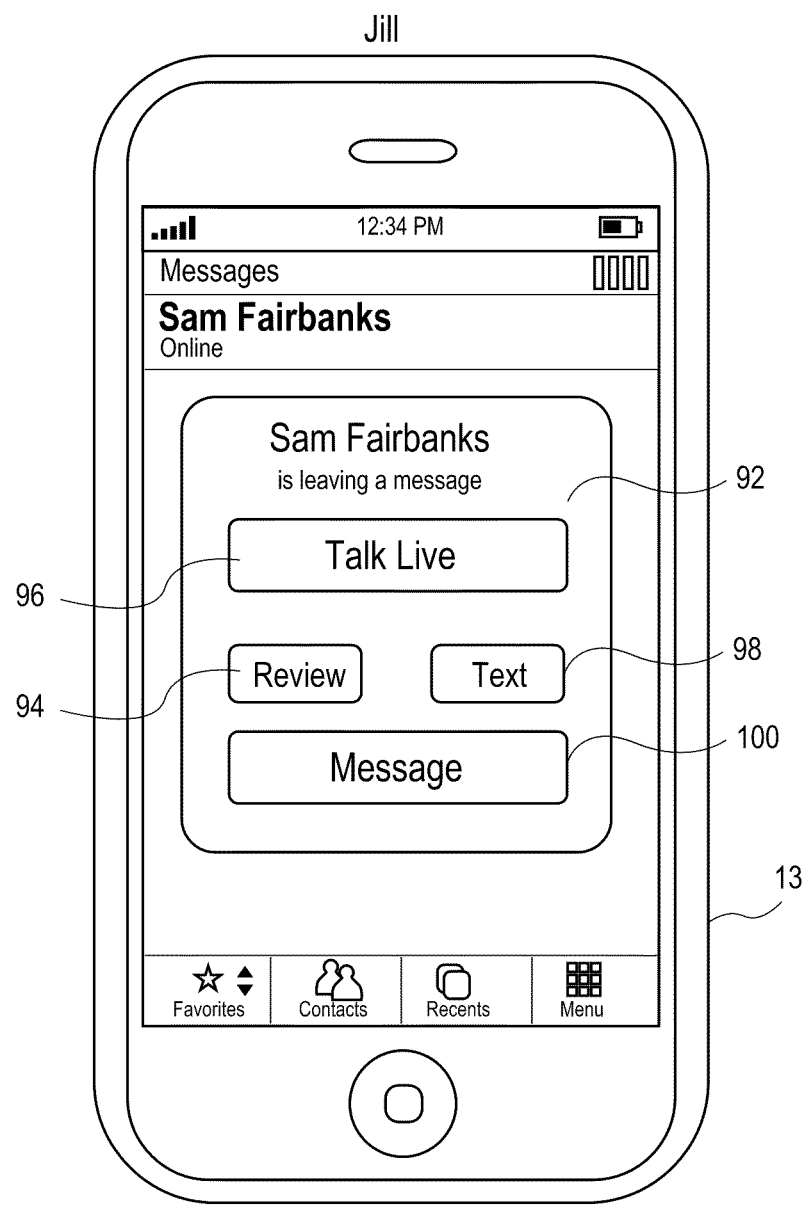

FIG. 5B shows the display 80 on Jill's device 13 after receiving notification that Sam Fairbanks is sending her a message. In this example, the notification is a window 92 appearing on the display 90 of Jill's device 13. Within the window 92, an indication is provided that Sam Fairbanks is leaving a message. In addition, Jill is presented with a number of options, including a "Review" icon 94 which will allow Jill to review (i.e., screen) the incoming message in real-time as it is being received, a "Talk Live" icon 96 that allows Jill to begin speaking live with Sam in the real-time mode, a "Text"

icon 98 that allows Jill to send an asynchronous text message to Sam, or a "Message" icon 100 that allows Jill to send an asynchronous reply voice message to Sam. It should be noted that audible notification signals, such as a ring tone or alarm, may optionally be used in cooperation with the window 92.

Figure 5C:
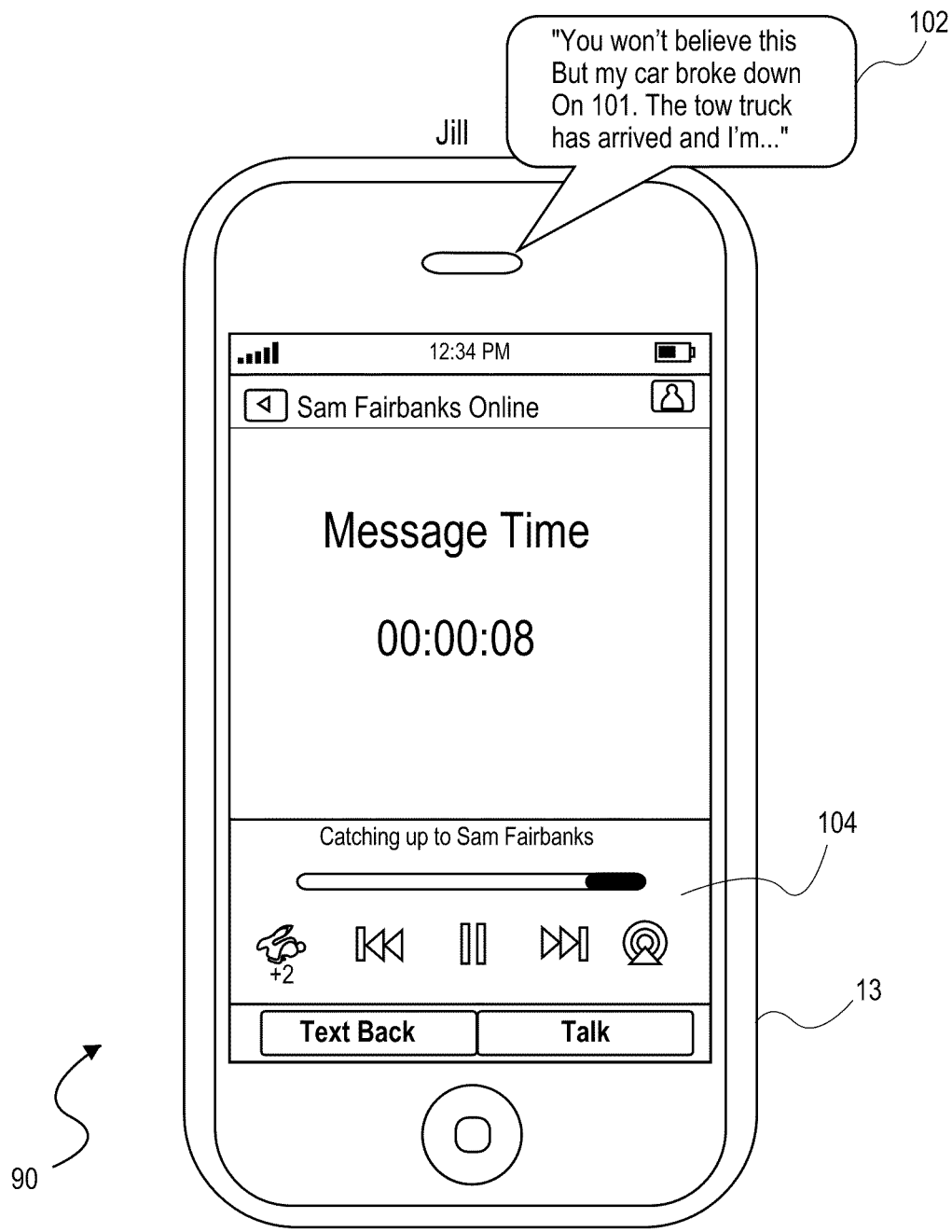

FIG. 5C shows the display 90 on Jill's device 13 after selecting the Review icon 94. A window 104 appears within the display 90. The window 104 provides a number of rendering options, including play, pause, replay, play faster, play slower, jump backward, jump forward, jump to the most recently received media, or catch up to the most recently received media (e.g., Catch Up to Live or CTL), as represented by the "rabbit" icon.

By selecting the play rendering option, the media of the incoming message is rendered at the same rate the media was originally encoded. This option allows the Jill to review or screen the incoming message from Sam. In one embodiment, the Sam is not notified that Jill is screening the message. In an alternative embodiment, Sam is notified that Jill is reviewing the message.

In this example, the "rabbit" CTL icon has been selected, causing Sam's message to be rendered from the beginning ("You won't believe this. But my car broke down . . . ") at rate faster than the media was originally encoded. When the "live" point is reached, Sam and Jill may engage in a "live" conversation in the real-time mode. Also in optional embodiments, a message "scrubber" bar and timer may also be displayed.

Figure 5D:
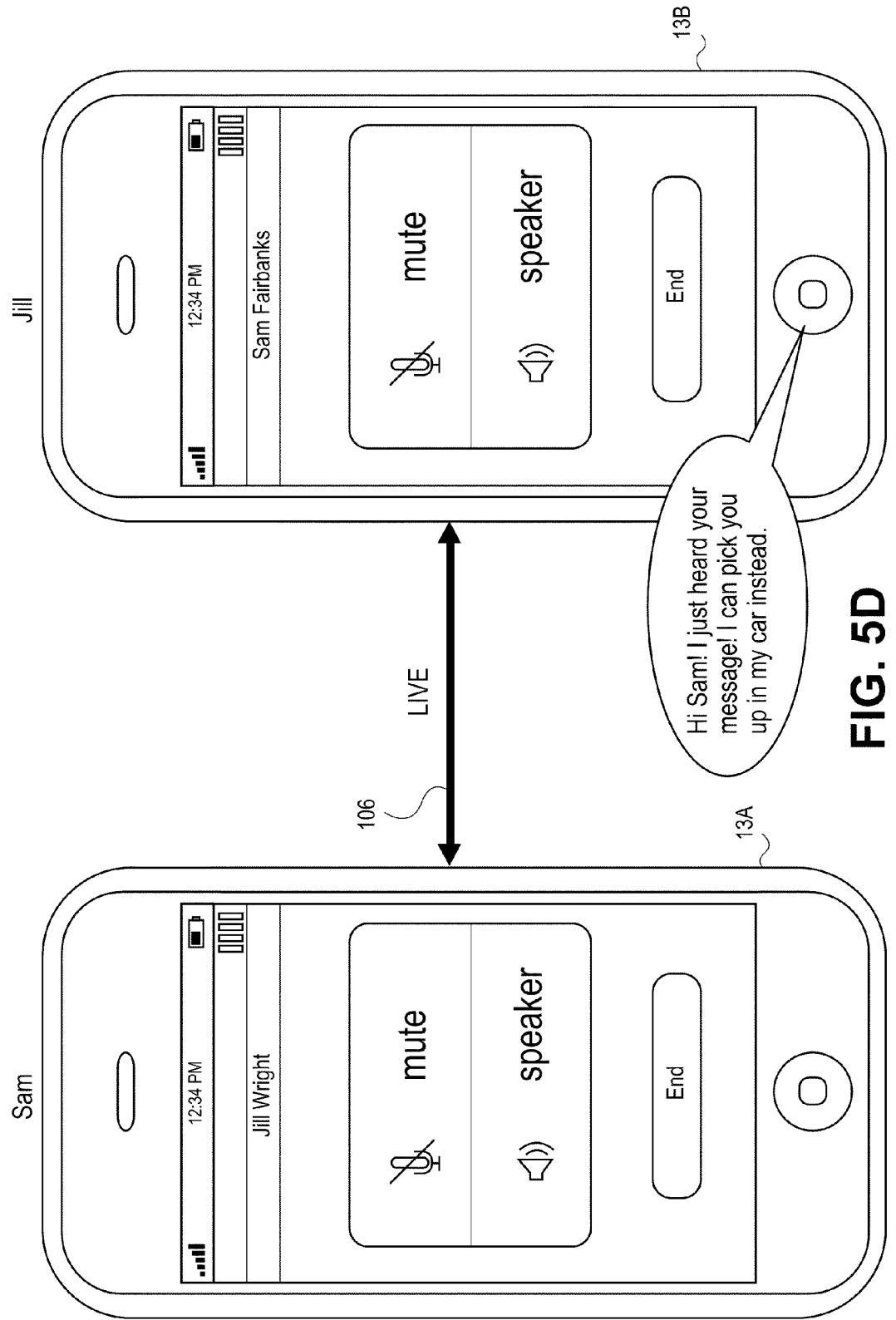

FIG. 5D shows both Sam's device 13A and Jill's device 13B when engaged in a "live" real-time conversation. As discussed above, Jill may elect to participate in a synchronous conversation with Sam either by selecting the "Talk Live" icon (as illustrated in FIG. 5) or using the CTL feature (as described above with regard to FIG. 5C). With the former, Jill may miss a portion of Sam's message before the point where she joins live, wherein with the latter option, she will hear the message from the beginning. Regardless of which method is used, the two parties may talk synchronously with one another in the real-time mode, as represented by the "LIVE" arrow 106 between the two devices, across the networks 14 and 18. When live, Jill and Sam have a conversation experience similar to a live, full-duplex, telephone call. Like any asynchronous messages, any media consumed "live" in the real-time mode is stored in the PIMB 26 on Jill's device 13 (as well as possibly Sam's device 13 and any intermediate servers 16) for later review.

Figure 5E:
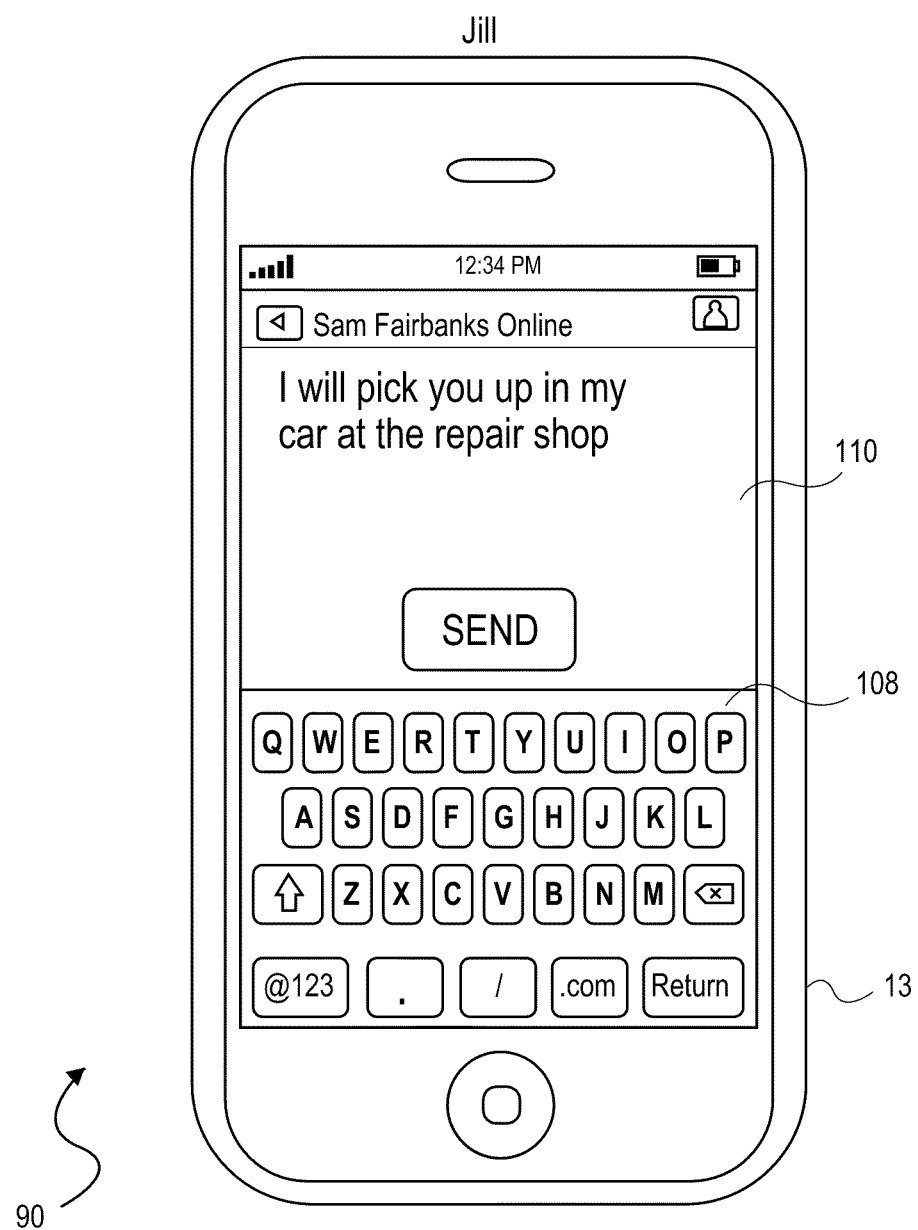

FIG. 5E shows Jill's device 13 after selecting the "text" icon 98. With this selection, a keyboard 108 appears on the display 90 of Jill's device 13. As Jill types, the message appears in text window 110. The "Send" icon is used to asynchronously send or transmit the text message when it is complete. In an alternative text embodiment, each keystroke may be transmitted as it is entered, providing the appearance that the text message is "synchronous", rather than asynchronous. As the transmission of each keystroke is actually a discrete event, the transmission of the text message one letter at a time is actually multiple asynchronous transmissions, one after the other. The transmission of each keystroke is therefore not a synchronous (i.e. continuous) transmission. In the example illustrated, the keyboard is presented in the display 90. With communication devices having either a built-in hardware keyboard, as provided for example on some "smart" mobile phones, or an associated keyboard, such as with a desktop or laptop computer, then there is no need to superimpose a keyboard in the display 90.

Figure 5F:
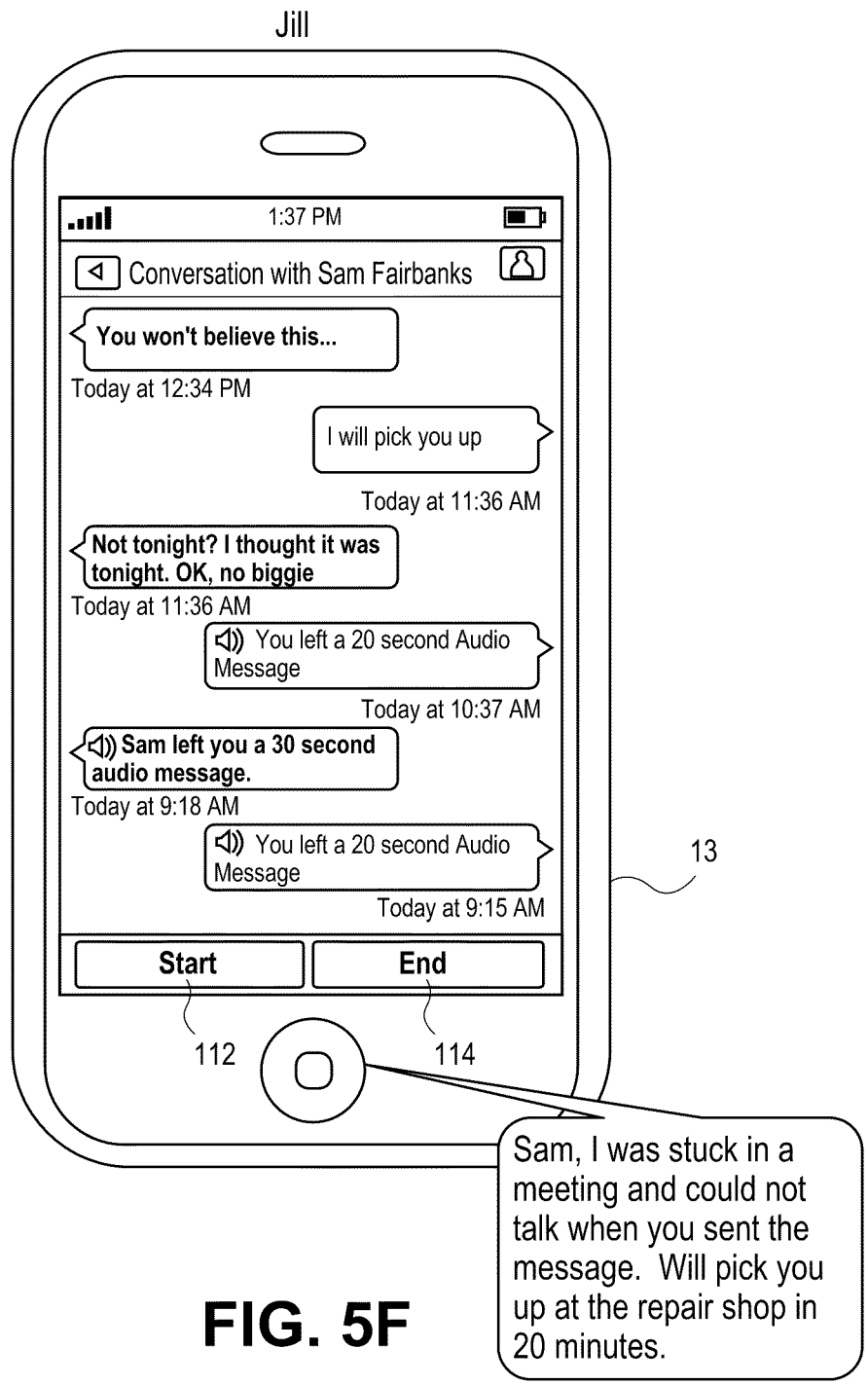

FIG. 5F shows Jill's device after selecting the Message icon 100. With this selection, the display 90 on Jill's device 13 shows the previous conversation history with Sam Fairbanks.

In this example, the conversation history includes media "bubbles" for both voice or text messages. With text messages, the actual text message (or a portion thereof) is provided in each text bubble. With voice messages, the name of the sender and the duration of the voice message are presented in each bubble. When either type of bubble is selected, the corresponding media of the message is retrieved from the PIMB 26 on Jill's device, and is rendered. In the case of text, the message is displayed in its entirety on the display 90. With voice, the message is rendered through a speaker on the device. The display 90 also includes "Start" and "End" message icons 112 and 114 respectively. When the Start icon 112 is selected, Jill may start creating her reply message to Sam. In this example, Jill informs Sam that she cannot talk because she is in a meeting, but will pick him up in 20 minutes. When done, the End icon 114 is selected, terminating the message. In an alternative embodiment, it is assumed that the message has ended a predetermined period of time after the creation of voice media has stopped. When the predetermined period of time has passed, the message is automatically terminated, without having to physically select the End icon 114.

Figure 5G:

FIG. 5G illustrates Jill's device 13 if she elects to ignore the incoming message from Sam Fairbanks. After the complete message is left, the display 90 on Jill's device 13 is updated to show that Sam Fairbanks has left a message. At any later arbitrary time, Jill may review the message from Sam Fairbanks asynchronously, in the time-shifted mode. Alternatively, Jill may elect to not review the message from Sam at all, either by actively deleting the message or ignoring it for a predetermined period of time, whereupon in some but not necessarily all embodiments, the message is automatically deleted. In the event Jill elects to review the message, Jill may optionally reply with another asynchronous voice or text message, attempt to talk live in the real-time mode with Sam, or not reply at all.

It should be noted that the various messages, icons and notifications mentioned above with regard to FIGS. 5A through 5G are merely exemplary. A wide variety different messages, icons and notifications, including audible, visual, text or icon based indicators may be used, either alone or in combination. In addition, the selection of the various icons and functions, and the scrolling through and/or selection of the various messages of a conversation, may be implemented in a number of ways, such as using an input device such as a finger stylus or pointer, using voice commands, or any other screen navigation, input or selection method. Those provided and described herein should therefore be considered as representative and not limiting the scope of the invention in any regard.

With the above examples, it is assumed that both Sam and Jill are using application 12 enabled devices 13. With both devices 13 running the application 12, the transmission and receipt of messages, regardless if consumed synchronously in the real-time or live mode or asynchronously in the time-shifted mode, may occur without a circuit connection, as required for conventional telephone calls. Rather, any media contained in the Vox messages 50 are transmitted or "streamed" between the two parties over the network 14 and the network(s) 18 as the media becomes available. The ability to stream the media progressively and simultaneously as the media is created on the transmitting device 13 and rendered on the receiving device 13 creates a user experience that is virtually identical to a conventional full-duplex telephone conversation. In addition with the storage of the streamed media in the PIMB 26 on each device 13, asynchronous messaging in the time-shifted mode is also possible. And as described above, the various rendering options makes it possible for the participants to seamlessly transition a conversation between the two modes.

In yet another embodiment, it may be possible for a legacy communication device, such as a conventional landline phone incapable of running the application 12, to enjoy many of the features and benefits of the application 12 as described herein. With this embodiment, one or more of the servers 16 on the network 14 is configured as a "gateway" server, which runs the application 12 on behalf of the legacy device. The Vox messages 50 containing the media are sent back and forth to the gateway server 16, where all the media is stored in the local PIMB on behalf of the legacy device. The legacy device can then either transmit media or receive media, either synchronously in the real-time mode or asynchronously in the time-shifted mode, using a variety of control methods, such as Dual Tone Multi-Frequency (DTMF) commands, voice activated commands, commands generated through a browser, radio signals, or any combination thereof. In this manner, a (or more) legacy device may communicate with either a application 12 enabled device 13 or another legacy device in the same manner as described herein, as if the application 12 resided on the legacy device.

G. FEATURES AND ADVANTAGES

The visual voice and text mail application 12 as described herein provides a number of features and advantages previously not provided or available with conventional visual voice or text applications. These features and advantages include:

(i) the ability to communicate by either voice, text or other media types using a single, unified, application;

(ii) the ability to have "instant" access to incoming messages and the ability to immediately send a response without dialing or otherwise establishing a circuit with the sender of the original message (i.e., "fire and forget" instant response capabilities);

(iii) the ability to store the media of conversations on servers 16, allow a user to maintain conversations histories, and participate in multiple conversions, using multiple communication application 12 enabled devices 13. For example, if a conversation is conducted on the work computer of a user, the entire conversation is accessible and may be down-loaded to the same user's cell phone, or vice versa. All of a user's conversations may therefore be conducted and managed across multiple communication devices;

(iv) the ability to provide a user with the flexibility to play messages in a preferred order, elect to either join a conversation related to an incoming message, ignore an incoming message and review it at a later time, or review an incoming message, while not joining a conversation with the sender of the message;

(v) the ability to provide a user with a host of rendering options, including playing faster, pausing the play of a message, catch up to the most recently received media, catching up to live cm, jump to live, play slower, etc.;

(vi) the ability to render previously received media of a message, while it is still being received, and to seamlessly transition the rendering of the message from an asynchronous time-shifted mode to a synchronous real-time mode using the CTL rendering feature;

(vii) the ability to organize conversations by a common attribute, such as but not limited to, participants, topic or subject, user group, or any other defined criteria;

(viii) the ability to both review the media of previously received messages while the device 13 is disconnected from the network 14 by retrieving and rendering media from the PIMB 26 and to create messages while disconnected from the network and transmitting the messages out of the PIMB 26 when the device 13 reconnects to the network;

(iix) the ability to communicate over any type of wired or wireless communication network, without any restrictions to a specific type of network, such as the PSTN;

(ix) the ability to engage or participate in multiple conversations at the same time by transitioning between conversations. For each selected conversation, messages can be either reviewed in real-time or the time-shifted mode. When participation in one conversation is complete, another conversation may be selected for participation;

(x) the ability to transcribe voice media into text and translate voice and/or text media from one language into one or more other languages; and (xi) the ability to engage in multi-party conference calls that are easily set up by simply selecting the names of the participants, without the need of bridge numbers or pin numbers. In addition, all the features described above with regard to (i) through (x) apply to conference calls.

With regard to messaging, the application 12 provides the advantages of: (i) having text and voice messages synchronized to your phone in real time. No dialing into a separate voice mail system is necessary; (ii) the ability to reply instantly to other users of application 12 enabled devices 12. No dialing, interrupting, or listening to greetings is necessary; (iii) the ability to review or listen to messages as they arrive and send messages as you speak; (iv) the ability to provide and receive real-time presence information for other users of the application 12; (v) easily keep track of incoming and outgoing messages; (vi) construct conversation histories of threaded messages; (vii) the ability to mix both voice, text and other media types within the context of a single conversation; and (viii) conduct multiple party conversations.

With regard to the visual interface, the application 12 allows a user to see all messages on the display of their device 13 and to scroll up and down to see the entire message history of a conversation. The application 12 also allows the user to render the media of messages in any order, to sort messages, or to filter messages.

The application 12 further provides a number of advantages previously not possible. Certain conversations, which may be considered more important than others, may be prioritized. For example while a person is driving their car, the application 12 on a user's mobile phone may be set so that incoming messages from family members are automatically rendered "live", while the messages pertaining to other conversations are stored in the PIMB 26 for later retrieval and review. By prioritizing conversations and messages in this manner, high priority messages can be heard automatically, while all other messages may be reviewed in a time-shifted mode. Important conversations can be monitored, while the messages pertaining to lower priority messages are available for later review. Alternatively the user may elect to join the conversation "live" using currently available hands-free technology, such as headsets and Bluetooth®.

Lastly with regard to integration, the application 12 may be integrated with other communication systems, such as SMS and IM systems, as well as integrate with other applications, such as an address book, calendar, call logs, etc.

It should also be understood that the present invention may be applied to any communication systems, including mobile or cellular phone networks, police, fire, military taxi, and first responder type communication systems, legacy circuit-based networks, VoIP networks, the Internet, or any combination thereof.

In various embodiments, devices 13 may be one of the following: land-line phone, wireless phone, cellular phone, satellite phone, computer, radio, server, satellite radio, tactical radio or tactical phone The types of media besides voice that may be generated on a communication device 13 and transmitted may further include video, text, sensor data, position or GPS information, radio signals, or a combination thereof.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A messaging method for communicating on a client communication device, the method comprising:
   simultaneously and progressively storing media of an incoming asynchronous voice message as the media of the incoming message is received at the client communication device of a first party over a network; and
   providing a rendering option for rendering the media of the incoming asynchronous voice message as the incoming media of the message is received at the client communication device;
   invoking a catch up to the most recently received media of the incoming asynchronous voice message while continuing progressively storing media of the incoming message as the media of the incoming message is progressively received, the catch up to the most recently received media rendering option causing:
   (i) rendering on the client communication device in a time-shifted mode the previously received media of the incoming asynchronous voice message out of storage at a rate faster relative to when the media of the incoming message was originally encoded; and
   (ii) seamlessly transitioning the rendering of the incoming media from the time-shifted mode to a real-time mode when the rendering of the previously received media of the incoming asynchronous voice message out of storage at the faster rate has caught up to and coincides with the media of the incoming message as the media is received over the network, the rendering of the media in the real-time mode occurring progressively as the media of the incoming asynchronous voice message is progressively received;
   enabling a live conversation, in the real-time mode, between the client communication device and a remote communication device of a second party sending the incoming asynchronous message;
   in the real-time mode, simultaneously and progressively storing incoming media received at the client communication device from the remote communication device; and
   in the real time mode, simultaneously and progressively storing outgoing media transmitted from the client communication device to the remote communication device.

2. The method of claim 1, wherein the rendering option is either:
   (i) a catch-up-to-live (CTL) rendering option and the rendering of the media of the incoming asynchronous voice message after the seamless transition is live as the media of the incoming message is created and transmitted over the network; or
   (ii) a catch-up-to the most recently received media of the incoming asynchronous voice message, where the media of the incoming message was created at a time before the media is transmitted and received at the client communication device over the network.

3. The method of claim 1, wherein the media of the asynchronous voice message comprises one of the following:
   (i) voice media;
   (ii) video media;
   (iii) text media;
   (iv) GPS data;
   (v) sensor data;
   (vi) photos or images; or
   (vii) any combination of (i) through (vi).

4. The method of claim 1, further comprising providing a screening option which enables the screening of the media of the incoming asynchronous voice message in real-time, as the media of the incoming message is received over the network.

5. The method of claim 1, further comprising providing an ignore option for ignoring of the media of the incoming asynchronous voice message.

6. The method of claim 1, further comprising generating on the client communication device a response message and transmitting the response message over the network to a remote communication device which sent the incoming asynchronous voice message.

7. The method of claim 6, wherein the response message is sent synchronously relative to the incoming asynchronous voice message.

8. The method of claim 6, wherein the media of the incoming asynchronous voice message and the response message is voice media respectively.

9. The method of claim 6, wherein the media of the incoming asynchronous voice message is voice media and the media of the response message is text media.

10. The method of claim 6, wherein transmitting the response message over the network to the remote communication device further comprises transmitting the response message without first establishing a circuit connection over the network with the remote communication device.

11. The method of claim 1, further comprising providing a delete option for deleting the incoming asynchronous voice message.

12. The method of claim 11, wherein providing the delete option further comprises one of the following:
   (i) providing the option to manually delete the incoming asynchronous voice message;
   (ii) providing for the automatic deletion of the incoming asynchronous voice message after a predetermined period of time has lapsed after receipt of the incoming asynchronous voice message; or
   (iii) providing both (i) and (ii).

13. The method of claim 1, further comprising associating the incoming asynchronous voice message with a conversation.

14. The method of claim 13, further comprising selectively displaying a history of the conversation, the history including the asynchronous voice messages associated with the conversation.

15. The method of claim 1, further comprising visually displaying a visual indicator showing the receipt of the incoming asynchronous voice message at the client communication device before the incoming message is received in full.

16. The method of claim 1, further comprising notifying on the communication device the receipt of the incoming asynchronous voice message before the incoming asynchronous voice message is received in full.

17. A messaging application capable of supporting both synchronous and asynchronous messaging on a communication device, the messaging application including modules for performing the steps recited in claim 1.

18. The communication device of claim 17, comprising:
a housing;
a processor contained in the housing; and
the messaging application running on the processor.

19. The method of claim 1, further comprising:
receiving meta data associated with the incoming message; and
notifying on the communication device the receipt of the incoming asynchronous voice message when the meta data associated with the incoming asynchronous voice message is received, but before the media of the incoming message is received in full.

20. The method of claim 16, wherein the notification of the receipt of the incoming asynchronous voice message before the incoming asynchronous voice message is received in full further comprises one of the following:
(i) providing a visual indicator on the client communication device;
(ii) providing an audio indicator on the client communication device; or
(iii) both (i) and (ii).

21. A messaging method for communicating on a client communication device, the method comprising:
simultaneously and progressively storing media of an incoming asynchronous voice message as the media of the incoming message is received at the client communication device of a first party over a network; and
providing on the communication device one or more options for responding to the incoming asynchronous voice message, the one or more options including:
(i) rendering the media of the incoming asynchronous voice message from storage;
(ii) screening the media of the incoming asynchronous voice message as the media is received over the network;
(iii) joining a live conversation with the sender of the incoming asynchronous voice message as the media of the incoming message is received over the network and simultaneously and progressively storing media associated with the live conversation received at the client communication device;
(iv) invoking a catch up to the most recently received media of the incoming asynchronous voice message while continuing progressively storing media of the incoming asynchronous voice message as the media of the incoming asynchronous voice message is progressively received, the catch up causing rendering the media of the incoming asynchronous voice message previously received from storage at a rate faster than the media was originally encoded in a time-shifted mode and then seamlessly transitioning the rendering of the media of the incoming asynchronous voice message as the media is received over the network when the rendering from storage has caught up to and coincides with the media of the incoming asynchronous voice message as it is received over the network, the rendering of the media in a real-time mode occurring progressively as the media of the incoming asynchronous voice message is progressively received, enabling a live conversation, in a real-time mode, between the client communication device and a remote communication device of a second party sending the incoming asynchronous message, and simultaneously and progressively storing media associated with the conversation in the real-time mode; and
(v) ignoring the media of the incoming asynchronous voice message.

22. The method of claim 21, further comprising:
notifying on the communication device the receipt of the incoming asynchronous voice message received over the network as soon as meta data associated with the incoming media is received at the client communication device.

23. The method of claim 21, wherein screening the media of the incoming asynchronous voice message as the media is received over the network further comprise not notifying the sender of the incoming message that the incoming message is being reviewed.

24. The method of claim 21, further comprising generating on the communication device a response message and transmitting the response message over the network to a remote communication device which sent the incoming asynchronous voice message.

25. The method of claim 24, wherein the response message is sent synchronously relative to the incoming asynchronous voice message.

26. The method of claim 24, wherein the response message is sent asynchronously relative to the incoming asynchronous voice message.

27. The method of claim 24, wherein the media of the incoming asynchronous voice message and the response message is voice media respectively.

28. The method of claim 24, wherein the media of the incoming asynchronous voice message is voice media and the media of the response message is text media.

29. The method of claim 24, wherein transmitting the response message over the network to the remote communication device further comprises transmitting the response message without first establishing a circuit connection over the network with the remote communication device.

30. The method of claim 21, further comprising providing a delete option for deleting the incoming asynchronous voice message.

31. The method of claim 30, wherein providing the delete option further comprises one of the following:
(i) providing the option to manually delete the incoming asynchronous voice message;
(ii) providing for the automatic deletion of the incoming asynchronous voice message after a predetermined period of time has lapsed after receipt of the incoming message; or
(iii) providing both (i) and (ii).

32. The method of claim 21, further comprising associating the incoming asynchronous voice message with a conversation.

33. The method of claim 32, further comprising selectively displaying a history of the conversation, the history including the messages associated with the conversation, wherein the messages of the conversation comprises one of the following:
(i) one or more voice messages;
(ii) one or more text messages; or
(iii) a combination of (i) and (ii).

34. The method of claim 21, further comprising notifying on the client communication device the receipt of the incoming asynchronous voice message before the incoming message is received in full.

35. The method of claim 34, wherein notifying the receipt of the incoming asynchronous voice message before the incoming asynchronous voice message is received in full further comprises one of the following:
 (i) providing a visual indicator on the client communication device;
 (ii) providing an audio indicator on the client communication device; or
 (iii) both (i) and (ii).

36. A messaging application capable of supporting both synchronous and asynchronous messaging on a communication device, the messaging application including modules for performing the steps recited in claim 21.

37. The communication device of claim 36, further comprising:
 a housing; and
 a processor contained in the housing, the messaging application running on the processor.

38. A messaging method for communicating on a client communication device, the method comprising:
 receiving an incoming asynchronous voice message over a network at the client communication device of a first party;
 notifying on the communication device an indicator indicating the receipt of the incoming asynchronous voice message at the client communication device before the incoming message is received in full at the client communication device;
 simultaneously and progressively storing media of the incoming asynchronous voice message as the media of the incoming asynchronous voice message is received at the client communication device over the network; and
 providing on the client communication device one or more options for responding to the media of the incoming asynchronous voice message, the one or more options including:
  (i) rendering the media of the incoming asynchronous voice message from storage;
  (ii) screening the media of the incoming asynchronous voice message as the media is received over the network;
  (iii) joining a live conversation with the sender of the incoming asynchronous voice message as the media of the incoming asynchronous voice message is received over the network and simultaneously and progressively storing media associated with the live conversation received at the client communication device;
  (iv) invoking a catch up to the most recently received media of the incoming asynchronous voice message while continuing progressively storing media of the incoming message as the media of the incoming asynchronous voice message is progressively received, the catch up causing rendering the media of the incoming asynchronous voice message previously received from storage at a rate faster than the media was originally encoded in a time-shifted mode and then seamlessly transitioning the rendering of the media of the incoming asynchronous voice message "live" in a real-time mode as the media is received over the network when the rendering from storage has caught up to and coincides with the media of the incoming asynchronous voice message as it is received over the network, the rendering of the media in the real-time mode occurring progressively as the media of the incoming asynchronous voice message is progressively received, enabling a live conversation, in a real-time mode, between the client communication device and a remote communication device of a second party sending the incoming asynchronous message, and simultaneously and progressively storing media associated with the conversation in the real-time mode; and
  (v) ignoring the media of the incoming asynchronous voice message.

39. The method of claim 36, wherein the notification indicating the receipt of the incoming asynchronous voice message occurs when meta data associated with the incoming asynchronous voice message is received, but before the media of the incoming asynchronous voice message is received in full.

40. The method of claim 38, further comprising:
 simultaneously and progressively storing media of the incoming asynchronous voice message as the media of the incoming message is received at the client communication device over the network; and
 providing a rendering option to catch up to the most recently received media of the incoming asynchronous voice message, the catch up to the most recently received media rendering option causing:
  (i) rendering on the client communication device in a time-shifted mode the previously received media of the incoming asynchronous voice message out of storage at a rate faster relative to when the media of the incoming message was originally encoded; and
  (ii) seamlessly transitioning the rendering of the incoming media from the time-shifted mode to a real-time mode when the rendering of the previously received media of the incoming asynchronous voice message out of storage at the faster rate has caught up to and coincides with the media of the incoming asynchronous voice message as the media is received over the network.

41. The method of claim 40, wherein the rendering option is either:
 (i) a catch-up-to-live (CTL) rendering option and the rendering of the media of the incoming asynchronous voice message after the seamless transition is live as the media of the incoming asynchronous voice message is created and transmitted over the network; or
 (ii) a catch-up-to the most recently received media of the incoming asynchronous voice message, where the media of the incoming asynchronous voice message was created at a time before the media is transmitted and received at the client communication device over the network.

42. The method of claim 38, wherein the notification comprises one of the following:
 (i) a visual indicator notifying the receipt of the incoming message;
 (ii) an audible notification notifying of the receipt of the incoming message; or
 (iii) both (i) and (ii).

43. The method of claim 38, wherein screening the media of the incoming asynchronous voice message as the media is received over the network further comprise not notifying the sender of the incoming asynchronous voice message that the incoming asynchronous voice message is being reviewed.

44. The method of claim 38, further comprising generating on the client communication device a response message and transmitting the response message over the network to a remote communication device which sent the incoming asynchronous voice message.

45. The method of claim 44, wherein the response message is sent synchronously relative to the incoming asynchronous voice message.

46. The method of claim 44, wherein the response message is sent asynchronously relative to the incoming asynchronous voice message.

47. The method of claim 44, wherein the media of the incoming asynchronous voice message and the response message is voice media respectively.

48. The method of claim 47, wherein the media of the incoming asynchronous voice message is voice media and the media of the response message is text media.

49. The method of claim 44, wherein transmitting the response message over the network to the remote communication device further comprises transmitting the response message without first establishing a circuit connection over the network with the remote communication device.

50. The method of claim 38, further comprising associating the incoming asynchronous voice message with a conversation.

51. The method of claim 50, further comprising selectively displaying a history of the conversation, the history including the messages associated with the conversation, wherein the messages of the conversation comprises one of the following:

(i) one or more voice messages;

(ii) one or more text messages; or (iii) a combination of (i) and (ii).

52. A messaging application capable of supporting both synchronous and asynchronous messaging on a client communication device, the messaging application including modules for performing the steps recited in claim 38.

53. The communication device of claim 52, further comprising:

a housing; and a processor contained in the housing, the messaging application running on the processor.

* * * * *